(12) United States Patent
Tanaka et al.

(10) Patent No.: US 11,491,943 B2
(45) Date of Patent: Nov. 8, 2022

(54) FRONT PASSENGER SEAT AIRBAG

(71) Applicant: TOYODA GOSEI CO., LTD., Kiyosu (JP)

(72) Inventors: Motoyuki Tanaka, Kiyosu (JP); Ikuo Yamada, Kiyosu (JP); Hajime Kitte, Kiyosu (JP); Kenichi Fukurono, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/213,877

(22) Filed: Mar. 26, 2021

(65) Prior Publication Data
US 2021/0300282 A1 Sep. 30, 2021

(30) Foreign Application Priority Data

Mar. 30, 2020 (JP) .............................. JP2020-061215
Mar. 30, 2020 (JP) .............................. JP2020-061216

(51) Int. Cl.
*B60R 21/205* (2011.01)
*B60R 21/233* (2006.01)
(Continued)

(52) U.S. Cl.
CPC .......... *B60R 21/205* (2013.01); *B60R 21/233* (2013.01); *B60R 21/2338* (2013.01);
(Continued)

(58) Field of Classification Search
CPC .... B60R 2021/0009; B60R 2021/0023; B60R 2021/0048; B60R 2021/23161;
(Continued)

(56) References Cited

U.S. PATENT DOCUMENTS 3,733,091 A * 5/1973 Fleck .................... B60R 21/231
280/729
3,784,225 A * 1/1974 Fleck .................... B60R 21/231
280/729
(Continued)

FOREIGN PATENT DOCUMENTS

JP 2007145098 A * 6/2007 ........... B60R 21/205
JP 2011121581 A * 6/2011
(Continued)

*Primary Examiner* — Laura Freedman
(74) *Attorney, Agent, or Firm* — Posz Law Group, PLC

(57) ABSTRACT

A front passenger seat airbag includes an attachment portion provided on a front end side when inflation has been completed, an occupant protection portion provided on a rear end side to protect the occupant when inflation has been completed, and a cavity portion formed at an intermediate portion between the attachment portion and the occupant protection portion in a manner of penetrating the front passenger seat airbag substantially along a left-right direction. A left edge side and/or a right edge side of the occupant protection portion when inflation has been completed is formed with a protruding region protruding rearward and outward with respect to a central region. At least one of upper and lower edges of an occupant side panel is coupled to an end of the peripheral wall panel. An outer peripheral panel portion of the panel portion is a concave portion in a flatly deployed state.

13 Claims, 13 Drawing Sheets

(51) Int. Cl.
  *B60R 21/2338* (2011.01)
  *B60R 21/00* (2006.01)
(52) U.S. Cl.
  CPC ............ *B60R 2021/0009* (2013.01); *B60R 2021/23316* (2013.01); *B60R 2021/23324* (2013.01); *B60R 2021/23382* (2013.01)
(58) Field of Classification Search
  CPC .......... B60R 2021/23308; B60R 2021/23316; B60R 2021/23324; B60R 2021/23382; B60R 21/205; B60R 21/231; B60R 21/233; B60R 21/2338
  See application file for complete search history.

(56) References Cited

U.S. PATENT DOCUMENTS

| | | | | |
|---|---|---|---|---|
| 5,427,410 A * | 6/1995 | Shiota | ................ | B60R 21/231 |
| | | | | 280/743.1 |
| 6,846,008 B2 * | 1/2005 | Kamiji | ................ | B60R 21/231 |
| | | | | 280/729 |
| 7,025,376 B2 * | 4/2006 | Dominissini | ........ | B60R 21/233 |
| | | | | 280/743.2 |
| 7,052,042 B2 * | 5/2006 | Sato | ................ | B60R 21/231 |
| | | | | 280/743.1 |
| 7,404,575 B2 * | 7/2008 | Bito | ................ | B60R 21/237 |
| | | | | 280/743.1 |
| 8,240,705 B2 * | 8/2012 | Ishida | ................ | B60R 21/231 |
| | | | | 280/743.1 |
| 8,511,710 B2 * | 8/2013 | Fukawatase | ........ | B60R 21/205 |
| | | | | 280/743.1 |
| 8,662,527 B2 * | 3/2014 | Sato | ................ | B60R 21/205 |
| | | | | 280/743.1 |
| 8,876,156 B2 * | 11/2014 | Turnbull | ........ | B60R 21/205 |
| | | | | 280/743.1 |
| 10,137,853 B2 * | 11/2018 | Ohachi | ........ | B60R 21/231 |
| 10,363,898 B2 * | 7/2019 | Maenishi | ........ | B60R 21/2338 |
| 10,407,018 B2 * | 9/2019 | Sundararajan | ........ | B60R 21/214 |
| 10,703,320 B2 * | 7/2020 | Farooq | ........ | B60R 21/231 |
| 10,926,731 B2 * | 2/2021 | Nakajima | ........ | B60R 21/216 |
| 10,953,837 B2 * | 3/2021 | Arima | ........ | B60R 21/233 |
| 11,046,282 B2 * | 6/2021 | Lee | ........ | B60R 21/2338 |
| 11,066,032 B2 * | 7/2021 | Jaradi | ........ | B60R 21/205 |
| 11,186,248 B2 * | 11/2021 | Tanaka | ........ | B60R 21/01512 |
| 11,267,432 B2 * | 3/2022 | Nakajima | ........ | B60R 21/239 |
| 2016/0107598 A1 | 4/2016 | Fischer et al. | | |
| 2017/0334387 A1 | 11/2017 | Fischer et al. | | |
| 2017/0361800 A1 | 12/2017 | Ohachi et al. | | |
| 2018/0043852 A1 | 2/2018 | Fischer et al. | | |
| 2018/0056922 A1 | 3/2018 | Yamada | | |
| 2020/0114860 A1 | 4/2020 | Fischer et al. | | |
| 2020/0122678 A1 * | 4/2020 | Tanaka | ........ | B60R 21/0132 |
| 2021/0387591 A1 * | 12/2021 | Choi | ........ | B60R 21/01512 |
| 2022/0169199 A1 * | 6/2022 | Suzuki | ........ | B60R 21/2338 |

FOREIGN PATENT DOCUMENTS

| | | | |
|---|---|---|---|
| JP | 2011168128 A | * | 9/2011 |
| JP | 2017-222331 A | | 12/2017 |
| JP | 2018-34558 A | | 3/2018 |
| JP | 2018-150014 A | | 9/2018 |
| JP | 2019-81535 A | | 5/2019 |

* cited by examiner

FRONT PASSENGER SEAT AIRBAG

CROSS-REFERENCE TO RELATED APPLICATIONS

The present application claims the benefit of priority of Japanese Patent Application No. 2020-061215, filed on Mar. 30, 2020, and Japanese Patent Application No. 2020-061216, filed on Mar. 30, 2020, the disclosures of which are incorporated herein by reference.

TECHNICAL FIELD

The present disclosure relates to a front passenger seat airbag that is folded and stored in a storage portion provided in an instrument panel provided in front of an occupant seated in a front passenger seat, and is configured to inflate so as to protrude toward a vehicle rear side by flowing an inflation gas therein to protect the occupant.

BACKGROUND

A front passenger seat airbag is known in which a protruding inflation portion that partially protrudes rearward is provided on a left end side of an occupant side wall portion that is provided on an occupant side when inflation is completed, and a front passenger seat airbag is known in which a restraining recess for entering and restraining a head of an occupant moving forward is formed on a rear surface side of the front passenger seat airbag when inflation has been completed substantially along an upper-lower direction (for example, see JP-A-2018-34558). An airbag having a substantially tubular shape having a cavity portion formed in a manner of penetrating the airbag substantially along a left-right direction when inflation has been completed is known (for example, see JP-A-2017-222331).

However, in the related-art front passenger seat airbag, since the protruding inflation portion protrudes in a substantially box shape by coupling the occupant side wall portion and a separate panel material, a structure is complicated.

In the front passenger seat airbag disclosed in JP-A-2018-34558, the restraining recess is pulled forward by a tether provided inside the airbag, so that a shape of the recess toward a front side when inflation has been completed is stable. However, in the type of airbag disclosed in JP-A-2017-222331, which is formed with the cavity portion in an intermediate portion, since it is difficult to provide the tether due to limitation of a thickness of the airbag, a configuration such as the above-described front passenger seat airbag cannot be applied.

SUMMARY

An embodiment of the present disclosure is a front passenger seat airbag that is folded and stored in a storage portion provided in an instrument panel provided in front of an occupant seated in a front passenger seat, and is configured to inflate so as to protrude toward a vehicle rear side by flowing an inflation gas therein to protect the occupant, the front passenger seat airbag comprising:

a plurality of panel portions formed of flexible sheet bodies;

an attachment portion that is a bag-shaped structure formed by coupling corresponding edge portions of the plurality of panel portions to each other, is provided on a front end side when inflation has been completed, and is attached to the storage portion;

an occupant protection portion that is provided on a rear end side when inflation has been completed, and is configured to protect the occupant; and a cavity portion that is formed at an intermediate portion between the attachment portion and the occupant protection portion in a manner of penetrating the front passenger seat airbag substantially along a left-right direction, and is surrounded by an inflation portion, wherein at least one of a left edge side and a right edge side of the occupant protection portion when inflation has been completed is formed with a protruding region protruding rearward and outward with respect to a central region, wherein the panel portion includes:

a pair of side wall panel portions whose outer shape is substantially annular and that form left and right side surfaces when inflation has been completed;

an outer peripheral panel portion that is provided on an outer peripheral surface side when inflation has been completed, and whose left edge side and the right edge side are coupled to an outer peripheral edge of each of the side wall panel portions; and an inner peripheral panel portion that is provided on an inner peripheral surface side when inflation has been completed, and whose left edge side and the right edge side are coupled to an inner peripheral edge of each of the side wall panel portions, wherein the outer peripheral panel portion includes an occupant side panel provided on an occupant side and a peripheral wall panel, wherein at least one of upper and lower edges of the occupant side panel is coupled to an end of the peripheral wall panel, wherein the outer peripheral panel portion is a concave portion such that, in a state in which at least one of the upper and lower edges coupled to the end is flatly deployed, a central portion constituting the central region is recessed with respect to a protruding side portion constituting the protruding region, wherein the protruding region is formed by coupling a left edge or a right edge of the occupant side panel to a rear edge of the corresponding side wall panel portion, and wherein the protruding region protrudes with respect to the central region.

In the front passenger seat airbag according to the embodiment of the present disclosure, the cavity portion is formed in a manner of penetrating the front passenger seat airbag substantially along the left-right direction between the attachment portion provided on the front end side of the front passenger seat airbag when inflation has been completed and the occupant protection portion provided on the rear end side of the front passenger seat airbag when inflation has been completed. In other words, in the front passenger seat airbag according to the embodiment of the present disclosure, in a cross section substantially along the front-rear direction when inflation has been completed, the occupant protection portion is separated from an attachment portion side and independently inflates in a substantially plate shape substantially along the left-right direction by interposing the cavity portion between the attachment portion and the occupant protection portion. Further, the occupant side panel constituting the occupant side surface of the occupant protection portion is formed such that at least one of the upper edge and the lower edge are recessed toward a central side. In other words, the occupant side panel is formed such that a length dimension of the central region in the upper-lower direction is relatively small and a length dimension of the protruding region formed on a left edge side or a right edge side in the upper-lower direction is relatively large. The occupant side panel has a configuration in which the at least one of the upper edge and the lower edge, which is formed by recessing the central side, are coupled to corresponding ends of the peripheral wall panel. Therefore, when inflation has been completed, the central region of the occupant protection portion is formed such that a film length of the central region in the upper-lower direction is set shorter than a film length of the protruding region formed on a left edge side or a right edge side of the occupant protection portion. Due to this difference in film length, the protruding regions protrude obliquely rearward and outward with respect to the central region. More specifically, since the front passenger seat airbag according to the embodiment of the present disclosure has an annular shape with the cavity portion penetrating the front passenger seat airbag substantially along the left-right direction, an outer peripheral panel portion side is more likely to inflate in a direction away from the cavity portion than the inner peripheral panel portion on a cavity portion side when inflation has been completed. Since the occupant protection portion is formed of a portion on a rear portion side of an annular inflation portion surrounding the cavity portion penetrating the front passenger seat airbag in the left-right direction when inflation has been completed, in the occupant protection portion, the occupant side panel provided on the outer peripheral surface side is likely to inflate outward. At that time, the protruding regions formed on the left and right edge sides of the occupant protection portion are likely to inflate rearward and outward since the protruding regions are set to have longer upper and lower film lengths (film lengths from a coupling portion) than the central region. Therefore, the protruding regions inflate rearward and outward. Therefore, simply by setting an outer shape of the rear edges of the side wall panel portions and an outer shape of the left edge side or the right edge side in the occupant side panel in a manner of increasing film lengths thereof in the upper-lower direction, a protruding state of the protruding regions with respect to the central region can be maintained stably without separately providing a separate member. Further, even if the occupant moves obliquely forward at a time of an oblique collision or an offset collision of the vehicle, the occupant can be accurately protected by the protruding regions protruding obliquely rearward and outward with respect to the central region.

Therefore, in the front passenger seat airbag according to the embodiment of the present disclosure, it is possible to accurately protect the occupant with a simple configuration.

In the front passenger seat airbag according to the embodiment of the present disclosure, the cavity portion is formed in a manner of penetrating the front passenger seat airbag substantially along the left-right direction between the attachment portion provided on the front end side of the front passenger seat airbag when inflation has been completed and the occupant protection portion provided on the rear end side of the front passenger seat airbag when inflation has been completed. Therefore, as compared with a case in which the cavity portion is not formed, the volume of the region that inflates by actually flowing an inflation gas into an inside of the region can be reduced, the size of the inflator to be used can be reduced, and the entire device mounted on the vehicle can be made compact.

Further, in the front passenger seat airbag according to the embodiment of the present disclosure, the occupant side panel has a configuration in which both the upper edge and the lower edge are coupled to the corresponding ends of the peripheral wall panel to form a concave portion. Accordingly, the protruding regions can stably protrude rearward and outward over substantially the entire upper and lower portions when inflation has been completed.

Furthermore, in the front passenger seat airbag formed as described above, since the protruding regions are formed on both the left and right sides of the central region, the portion configured to receive the occupant that moves obliquely forward at a time of an oblique collision or an offset collision of the vehicle can be formed on both the left and right sides. Accordingly, the occupant that moves obliquely forward to left and obliquely forward to right can be accurately protected.

Furthermore, in the front passenger seat airbag formed as described above, a tether that connects a vicinity of the boundary portions between the protruding regions and the central region and the inner peripheral panel portion on the cavity portion side is provided inside the occupant protection portion. Accordingly, a protruding shape (a protruding state with respect to the central region) of the protruding regions can be further stabilized.

Another embodiment of the present disclosure is a front passenger seat airbag that is folded and stored in a storage portion provided in an instrument panel provided in front of an occupant seated in a front passenger seat, is a bag-shaped structure formed of a flexible sheet body, and is configured to inflate so as to protrude toward a vehicle rear side by flowing an inflation gas therein to protect the occupant, the front passenger seat airbag comprising:

an attachment portion that is provided on a front end side when inflation has been completed and is attached to the storage portion;

an occupant protection portion that is provided on a rear end side when inflation has been completed, and is configured to protect the occupant; and a cavity portion that is formed at an intermediate portion between the attachment portion and the occupant protection portion in a manner of penetrating the front passenger seat airbag substantially along a left-right direction, and is surrounded by an inflation portion, wherein the occupant protection portion is formed substantially along an upper-lower direction on a rear surface side when inflation has been completed, wherein the occupant protection portion is formed with a restraining recess configured to allow a head of the occupant that moves forward to enter the occupant protection portion and to restrain the head of the occupant, and wherein a distal end of a recess of the restraining recess is connected to an inner peripheral surface side of the cavity portion.

In the front passenger seat airbag according to another embodiment of the present disclosure, in a cross section substantially along the front-rear direction when inflation has been completed, the occupant protection portion is separated from an attachment portion side and independently inflates in a substantially plate shape substantially along the left-right direction by interposing the cavity portion between the attachment portion and the occupant protection portion. The restraining recesses formed in the occupant protection portion have a configuration in which distal ends of the recesses are directly connected to an inner peripheral surface side of the cavity portion. Therefore, a concave shape of the restraining recesses when inflation has been completed can be stably maintained. A depth of recesses of the restraining recesses required for the head of the occupant to enter the restraining recesses and to be restrained can be secured. Further, in the front passenger seat airbag according to the present disclosure, even if a portion of the peripheral edge of the restraining recesses in which the head of the occupant has entered and has been restrained is bottomed, in front of the occupant protection portion, the cavity portion surrounded by the inflation portion is formed. Since the distal ends of the recesses of the restraining recesses are connected to the inner peripheral surface side of the cavity portion, the inner peripheral surface of the cavity portion, with which the portion of the peripheral edge of the restraining recesses is to be bottomed, is in a state of generating tension that acts when the airbag is inflated. Accordingly, entering of the head of the occupant into the cavity portion in that state and a certain reaction force can be secured, and the head of the occupant can be received with good cushioning. As a result, even in a configuration in which the cavity portion is formed, when inflation of the front passenger seat airbag has been completed, the head of the occupant that moves forward can be smoothly protected by entering the restraining recesses.

Therefore, in the front passenger seat airbag according to another embodiment of the present disclosure, even if the airbag is formed with the cavity portion at an intermediate portion of the airbag, the head of the occupant can be accurately restrained by the restraining recesses formed on the rear surface side.

In the front passenger seat airbag according to another embodiment of the present disclosure, the cavity portion is formed in a manner of penetrating the front passenger seat airbag substantially along the left-right direction between the attachment portion provided on the front end side of the front passenger seat airbag when inflation has been completed and the occupant protection portion provided on the rear end side of the front passenger seat airbag when inflation has been completed. Therefore, as compared with a case in which the cavity portion is not formed, the volume of the region that inflates by actually flowing an inflation gas into an inside of the region can be reduced, the size of the inflator to be used can be reduced, and the entire device mounted on the vehicle can be made compact.

The front passenger seat airbag according to the another embodiment of the present disclosure, further comprising an upper side support inflation portion and a lower side support inflation portion that constitute upper and lower inflation portions around the cavity portion, wherein an upper end side and a lower end side of the occupant protection portion extend forward when inflation has been completed, and are supported by the upper side support inflation portion and the lower side support inflation portion, and wherein the upper side support inflation portion and the lower side support inflation portion communicate with each other by a communication inflation portion that constitutes a front surface side of the cavity portion.

In the front passenger seat airbag with this configuration, the occupant protection portion supported by the upper side support inflation portion and the lower side support inflation portion at the upper end side and the lower end side can receive the occupant that moves forward. The upper side support inflation portion and the lower side support inflation portion communicate with each other by the communication inflation portion constituting the front surface side of the cavity portion. In other words, since the upper side support inflation portion and the lower side support inflation portion are connected via the communication inflation portion, it is possible to prevent the front ends from approaching or separating from each other, and it is possible to accurately support the occupant protection portion. Therefore, even in a configuration in which the cavity portion is formed at the intermediate portion, the occupant that moves forward can be stably restrained by the occupant protection portion.

Furthermore, in the front passenger seat airbag with the above-described configuration, the upper side support inflation portion includes an upper side support surface portion that is provided on the front end side and is supported by the windshield provided above the instrument panel when inflation has been completed, and the lower side support inflation portion includes the lower side support surface portion that is provided on the front end side and is supported by the instrument panel when inflation has been completed. Accordingly, it is preferable that the front end of the upper side support inflation portion and the front end of the lower side support inflation portion can be stably supported by members on a vehicle body side and the occupant that moves forward can be more stably restrained by the occupant protection portion.

Furthermore, in the front passenger seat airbag with the above-described configuration, the cavity portion opens in a substantially square shape as viewed from the left and right sides when inflation has been completed. Accordingly, the occupant protection portion can be provided substantially along the upper-lower direction, and the communication inflation portion that communicates the upper side support inflation portion and the lower side support inflation portion can also be formed in a plate shape substantially along the occupant protection portion and substantially along the upper-lower direction. Therefore, it is preferable that, when inflation has been completed, the upper side support inflation portion and the lower side support inflation portion can stably regulate the front ends from approaching or separating from each other. Therefore, the upper end side and the lower end side of the occupant protection portion can be supported more stably by the upper side support inflation portion and the lower side support inflation portion. The occupant protection portion when inflation has been completed can be provided stably and widely in the upper-lower direction.

DESCRIPTION OF EMBODIMENTS

Figure 12:
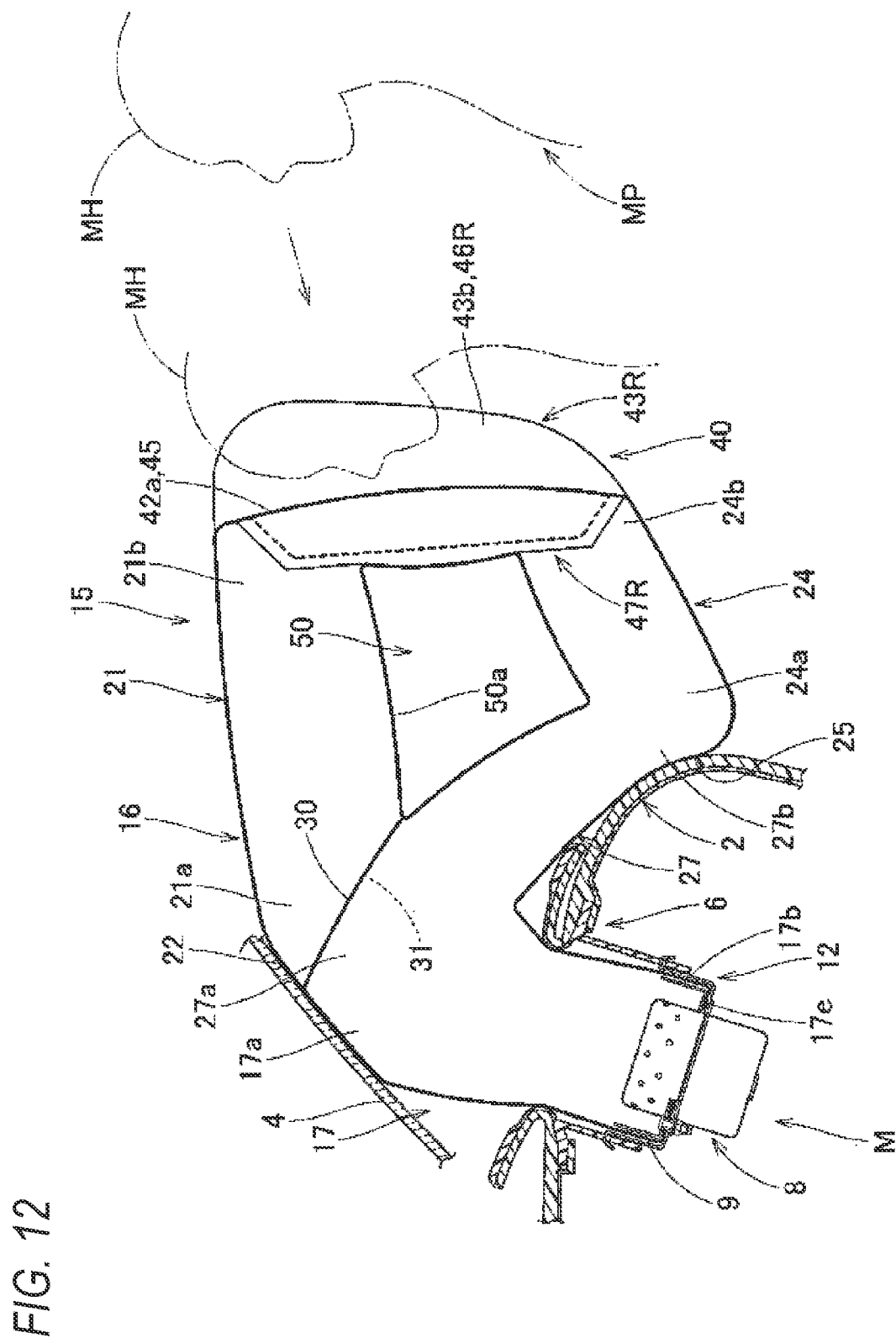
FIG. 12 is a schematic vertical cross-sectional view showing the airbag in a state in which inflation of the airbag has been completed in the front passenger seat airbag device according to the embodiment.
Figure 13:
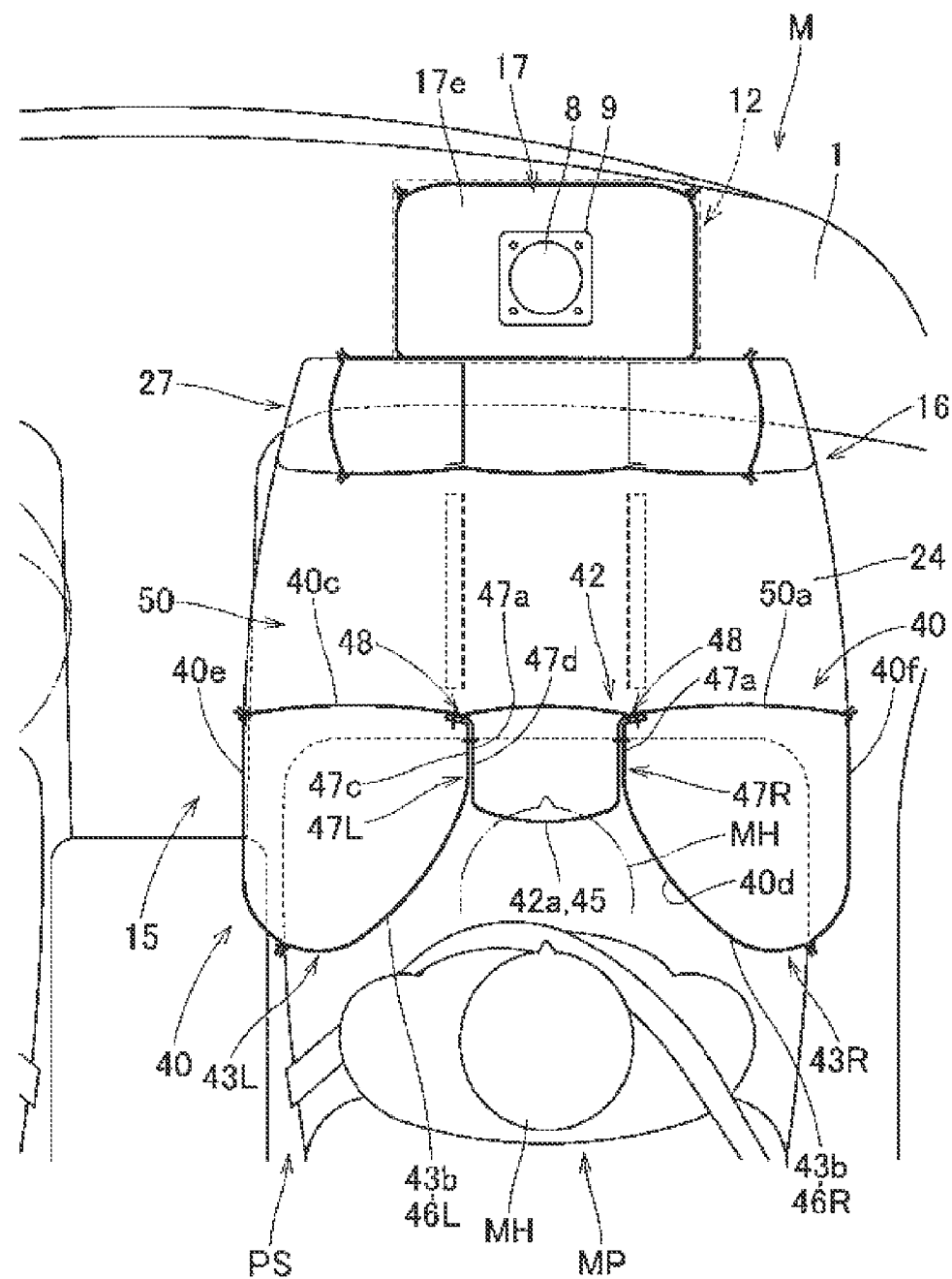
FIG. 13 is a schematic transverse cross-sectional view showing the airbag in the state in which inflation of the airbag has been completed in the front passenger seat airbag device according to the embodiment.

Hereinafter, an embodiment of the present disclosure will be described with reference to the drawings. As shown in FIGS. 12 and 13, a front passenger seat airbag (hereinafter, abbreviated as "airbag") 15 according to the embodiment is used in a top-mounted type front passenger seat airbag device M provided inside an upper surface 2 of an instrument panel 1 in front of an occupant MP seated in a front passenger seat PS. In the embodiment, front-rear, upper-lower, and left-right directions coincide with front-rear, upper-lower, and left-right directions of the vehicle, unless otherwise specified.

As shown in FIGS. 12 and 13, the front passenger seat airbag device M according to the embodiment includes the airbag 15, an inflator 8 configured to supply an inflation gas to the airbag 15, a case 12 serving as a storage portion configured to store and hold the airbag 15 and the inflator 8, a retainer 9 configured to attach the airbag 15 and the inflator 8 to the case 12, and an airbag cover 6 configured to cover the folded airbag 15. The airbag cover 6 includes a door portion (not shown) that can be opened when the airbag 15 is deployed and inflated. In the embodiment, the inflator 8 operates at a time of a front collision, an oblique collision, and an offset collision of the vehicle.

Figure 1:
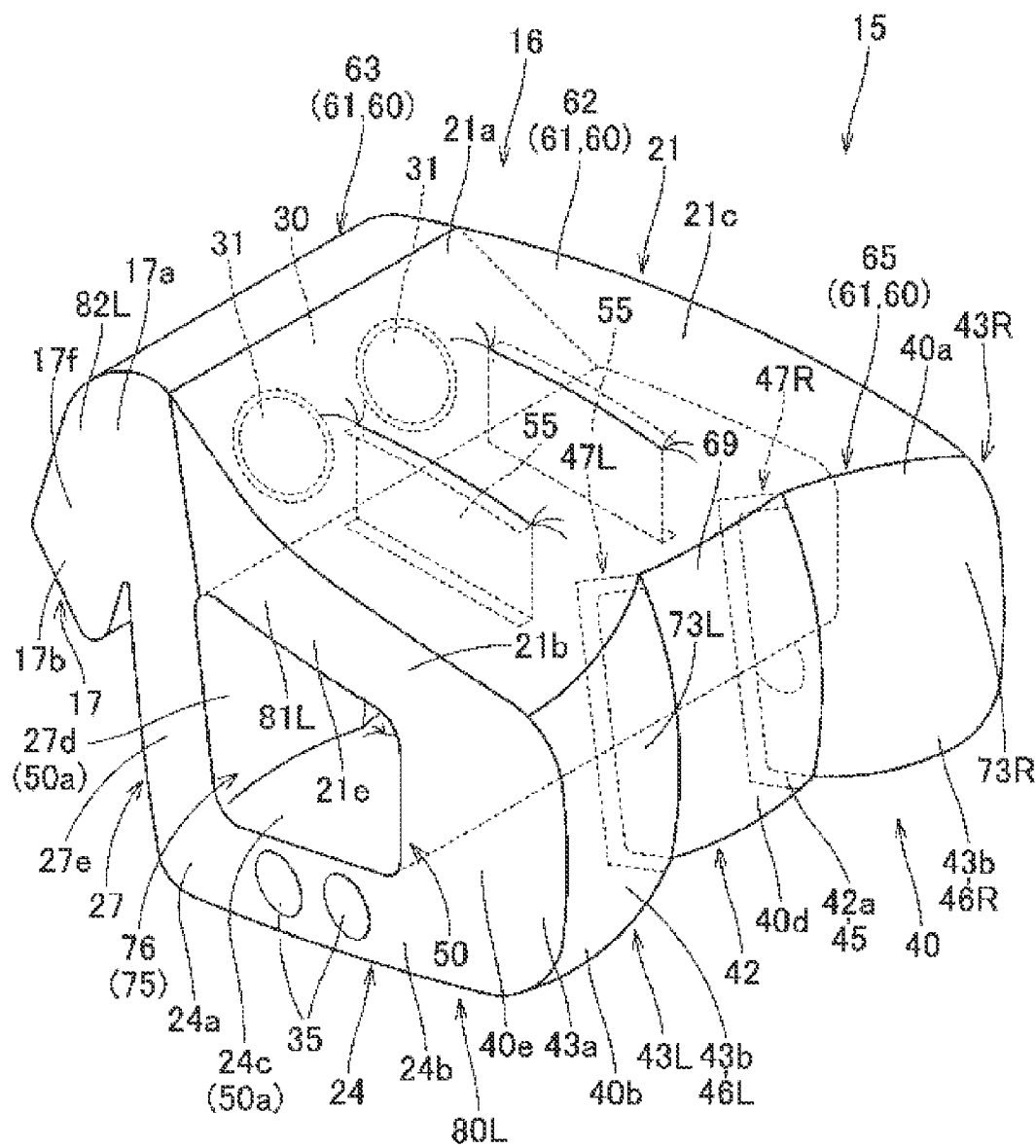
FIG. 1 is a perspective view showing an airbag used in a front passenger seat airbag device according to an embodiment of the present disclosure in a state in which the airbag is inflated alone, as viewed from an oblique rear left side.
Figure 2:
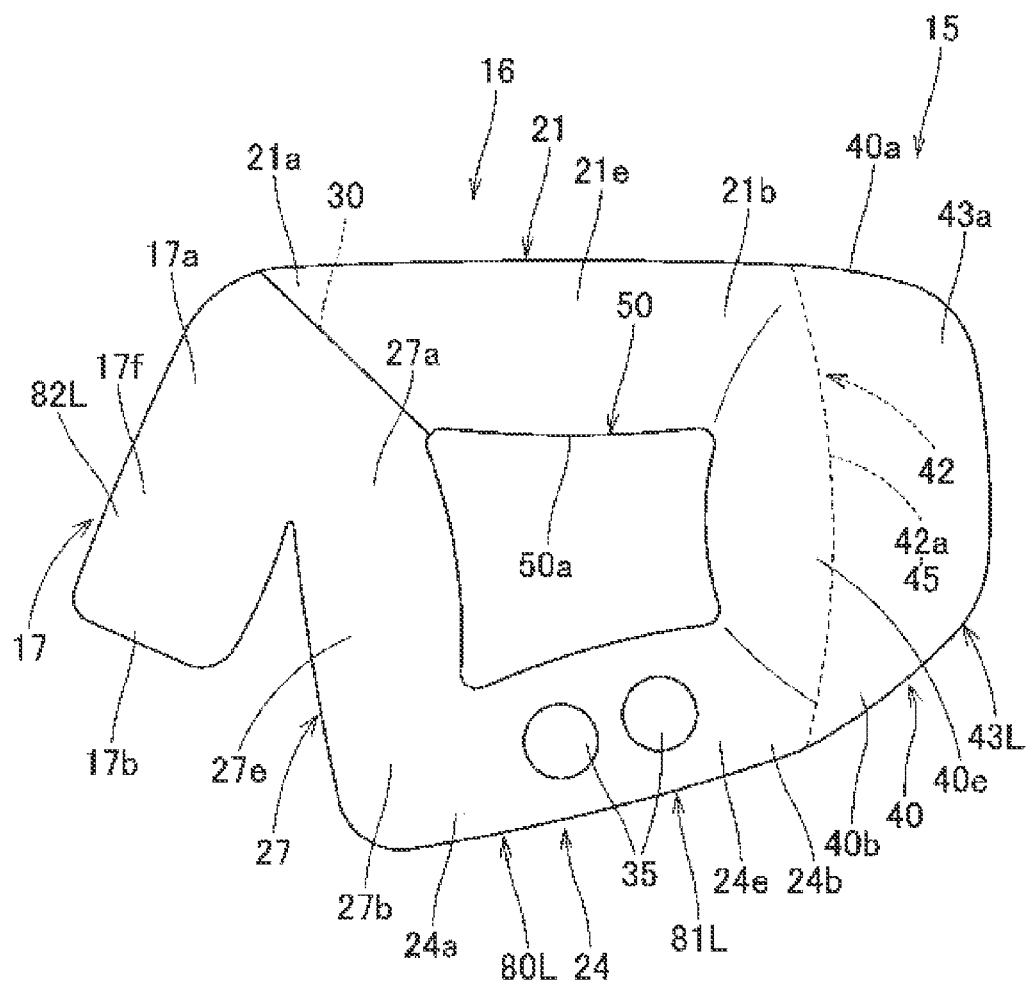
FIG. 2 is a left side view showing the airbag in FIG. 1.
Figure 3:
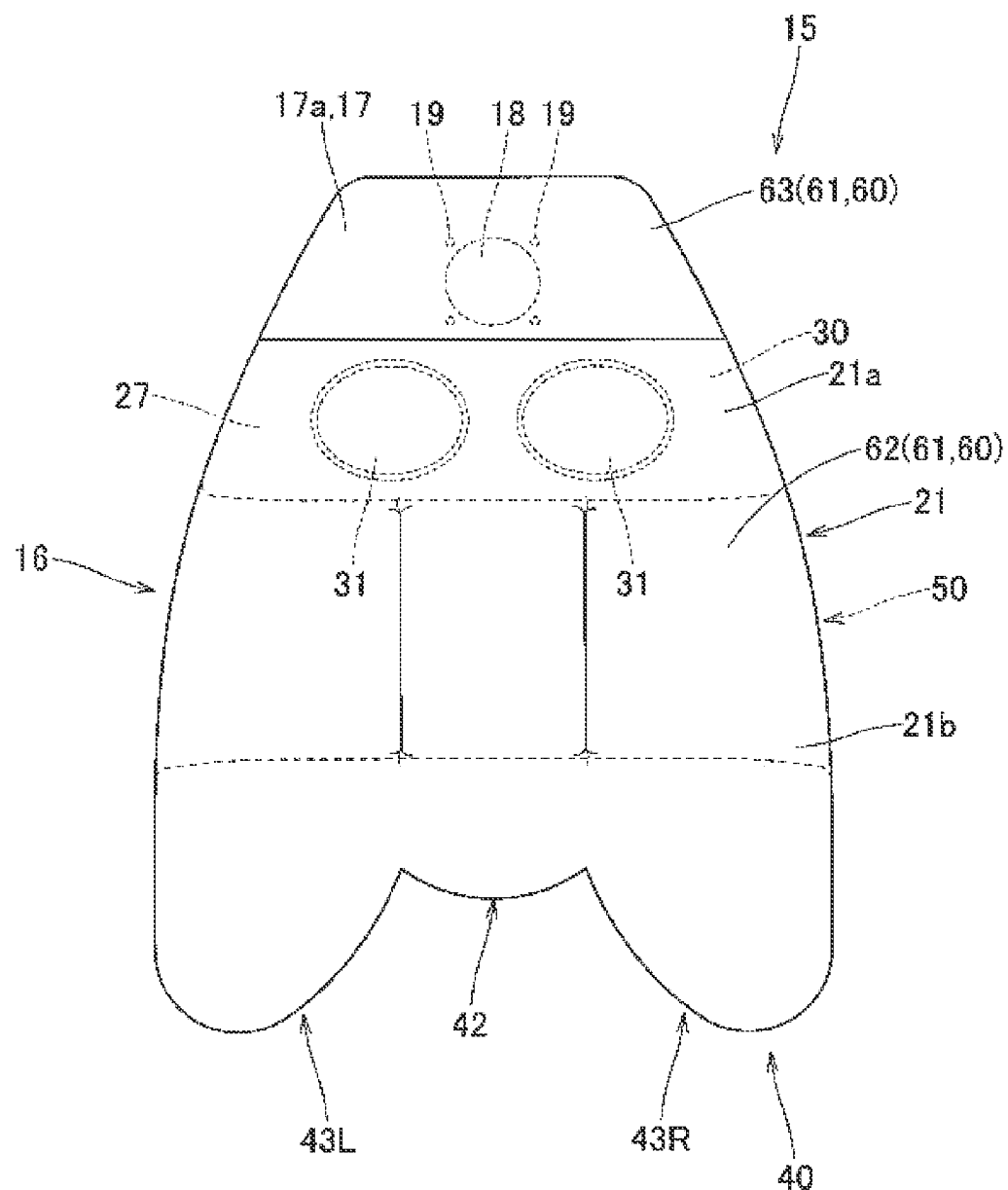
FIG. 3 is a plan view showing the airbag in FIG. 1.
Figure 4:
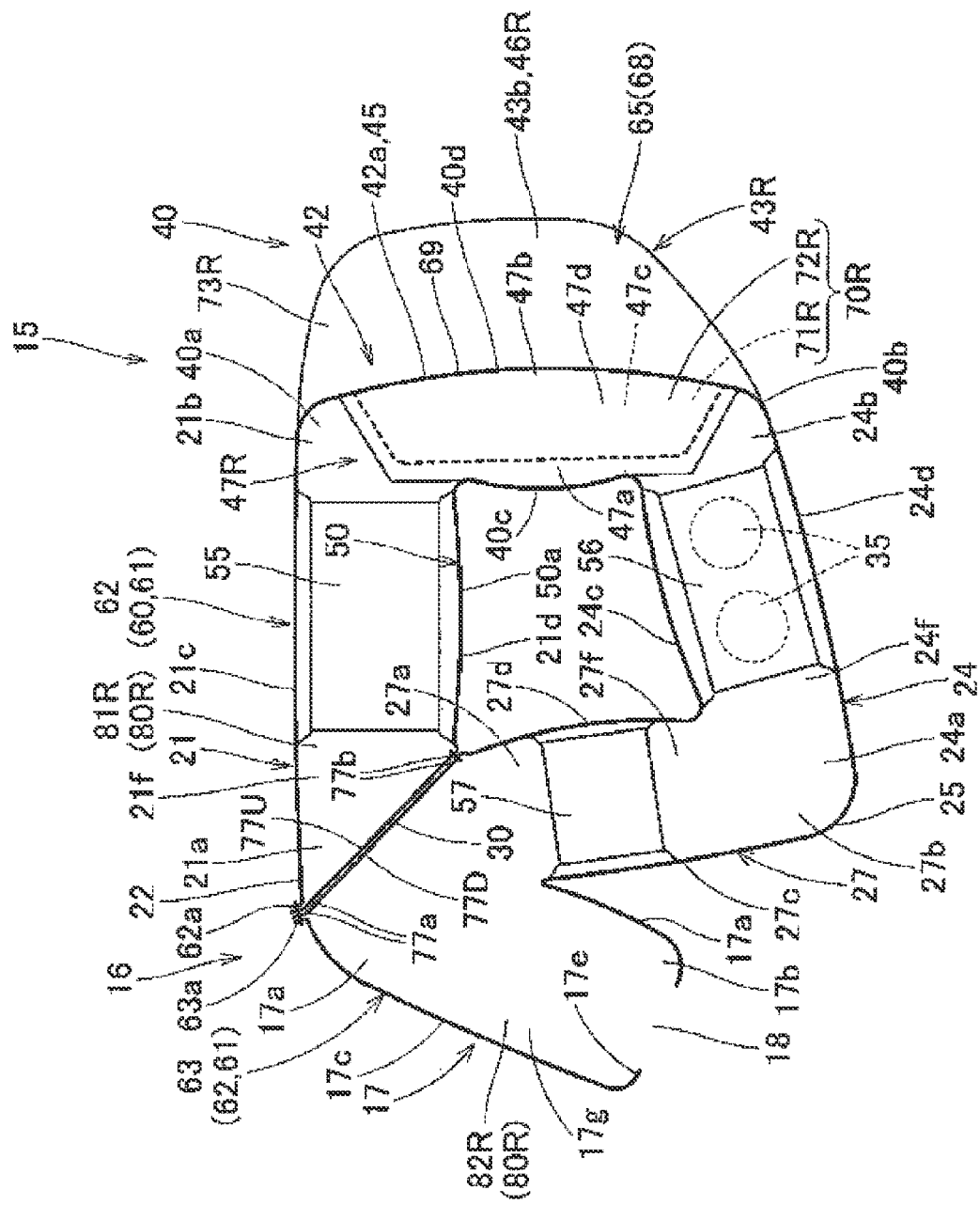
FIG. 4 is a schematic vertical cross-sectional view showing the airbag in FIG. 1 taken along a front-rear direction on a left-right center side.

As shown in FIGS. 1 to 6, the airbag 15 is a bag-shaped structure formed of a flexible sheet body, and has an inflation completed shape as a substantially square tubular shape whose axial direction is substantially along the left-right direction. In the embodiment, the airbag 15 has an inflation completed shape that is a substantially symmetrical shape in the left-right direction. Specifically, the airbag 15 includes an occupant protection portion 40 that is provided on a rear end side when inflation has been completed and can protect the occupant MP, and a vehicle body side inflation portion 16 provided on a front side of the occupant protection portion 40. The vehicle body side inflation portion 16 includes an attachment portion 17 that is provided on a front end side when inflation has been completed and is attached to the case 12 serving as a storage portion, an upper side support inflation portion 21 and a lower side support inflation portion 24 that are respectively formed on an upper surface side and a lower surface side when inflation has been completed substantially along the front-rear direction, and a communication inflation portion 27 configured to communicate a front end 21a of the upper side support inflation portion 21 and a front end 24a of the lower side support inflation portion 24. The airbag 15 is formed with a cavity portion 50 that penetrates the airbag 15 substantially along the left-right direction and is surrounded by an inflation portion. In the embodiment, the cavity portion 50 is surrounded by the communication inflation portion 27, the upper side support inflation portion 21, the lower side support inflation portion 24, and the occupant protection portion 40. That is, the upper side support inflation portion 21 and the lower side support inflation portion 24 constitute upper and lower inflation portions around the cavity portion 50, and the communication inflation portion 27 constitutes a front surface side of the cavity portion 50. As shown in FIGS. 1, 2, and 4, the cavity portion 50 opens in a substantially square shape as viewed from left and right sides. In the embodiment, the cavity portion 50 opens in a substantially trapezoidal shape that expands toward front.

Figure 14:
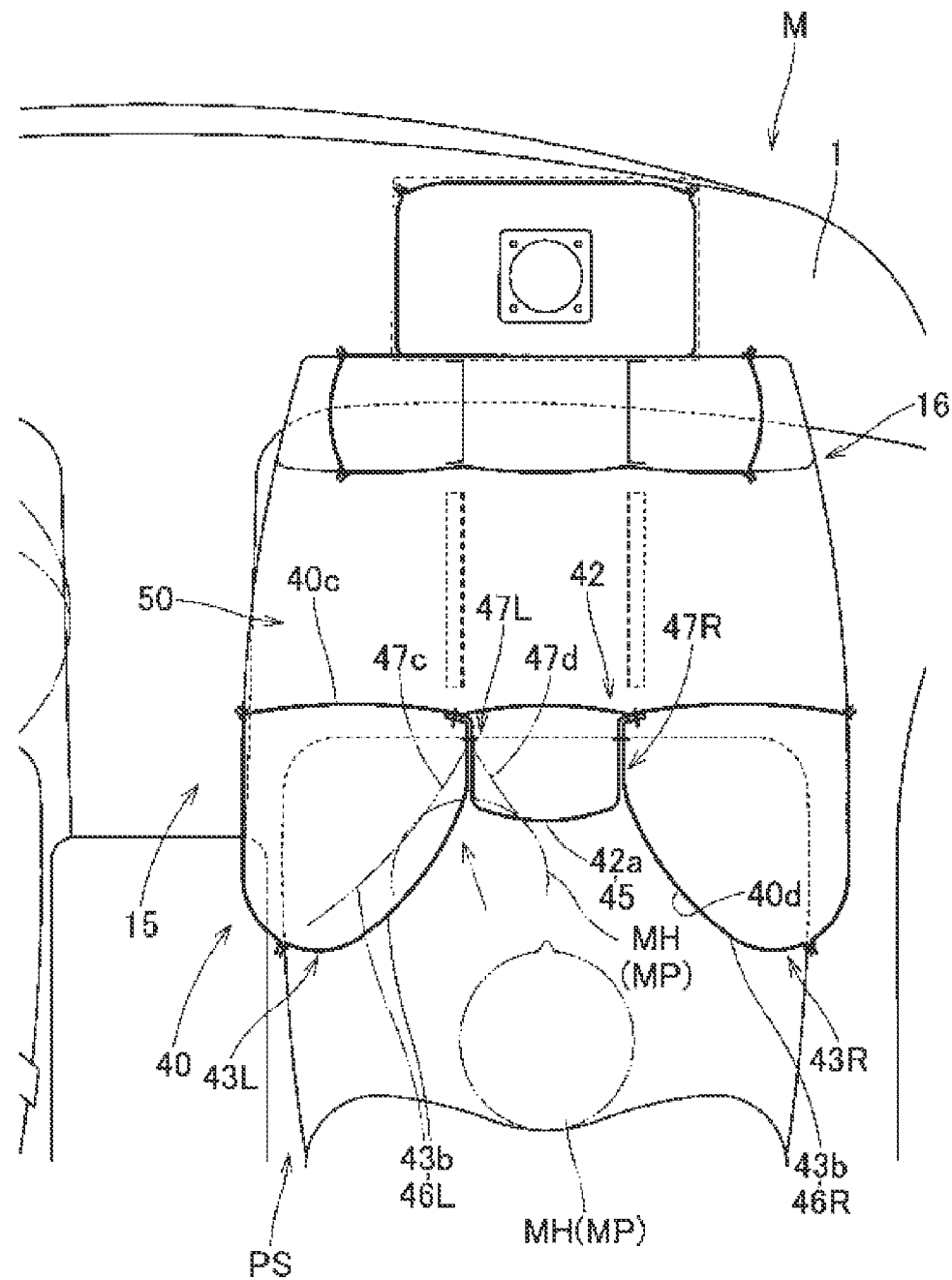
FIG. 14 is a schematic transverse cross-sectional view showing the airbag in the state in which inflation of the airbag has been completed in the front passenger seat airbag device according to the embodiment, and is a schematic view showing a state of receiving of a head of an occupant moving obliquely forward.

The attachment portion 17 has an inflation completed shape as a plate shape whose longitudinal direction is substantially along the left-right direction. In the attachment portion 17, an upper end 17a side is communicated with an upper end 27a side of the communication inflation portion 27. The attachment portion 17 is inclined forward and downward as viewed from the left and right sides when the inflation has been completed (see FIGS. 2 and 4). In the attachment portion 17, in a region of a lower wall portion 17e provided on a lower end 17b side, an inflow opening 18 that opens in a substantially circular shape to allow an inflation gas to flow therethrough and whose peripheral edge is attached to the case 12 is formed (see FIGS. 4 and 6). A plurality of (in the embodiment, four) attachment holes 19 through which bolts (not shown) of the retainer 9 are inserted to attach a peripheral edge of the inflow opening 18 to a bottom wall portion (not shown) of the case 12 are formed in the peripheral edge of the inflow opening 18. As shown in FIGS. 12 to 14, the attachment portion 17 has a configuration in which a region on the lower end 17b side is provided in the case 12 when inflation of the airbag 15 has been completed. A width dimension of the attachment portion 17 in a left-right direction when inflation has been completed is set smaller than that of other portions (see FIG. 6). Front, rear, left and right width dimensions of the attachment portion 17 are set to dimensions such that the attachment portion 17 can be provided in the case 12. In the embodiment, the attachment portion 17 is supported by the windshield 4 on the upper end 17a side when inflation has been completed (see FIG. 12).

Figure 6:
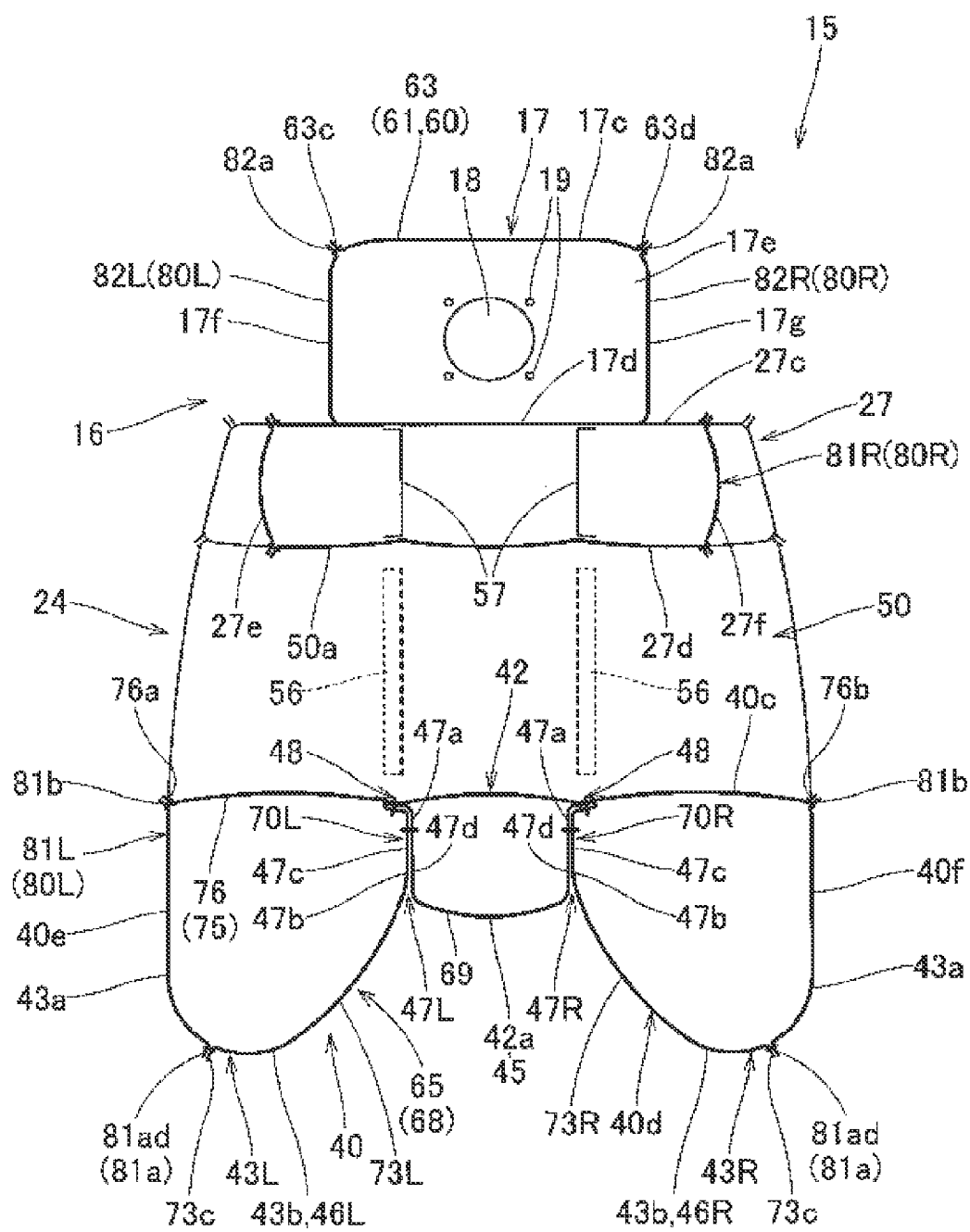
FIG. 6 is a schematic transverse cross-sectional view showing the airbag in FIG. 1 taken along the front-rear direction.

The communication inflation portion 27 has an inflation completed shape as a plate shape whose longitudinal direction is substantially along the left-right direction. In the communication inflation portion 27, the upper end 27 side is communicated with the upper end 17a of the attachment portion 17 and the front end 21a of the upper side support inflation portion 21, and a lower end 27b side is communicated with the front end 24a of the lower side support inflation portion 24. That is, the upper side support inflation portion 21 and the lower side support inflation portion 24 communicate with each other via the communication inflation portion 27. The communication inflation portion 27 is provided substantially along the upper-lower direction and substantially along the occupant protection portion 40 as viewed from the left and right sides when inflation has been completed (see FIG. 2). In the embodiment, the communication inflation portion 27 is formed such that the upper end 27a side communicating with the attachment portion 17 and the upper side support inflation portion 21 is narrow and the lower end 27b side communicating with the lower side support inflation portion 24 is widened to left and right. A lower portion front surface side (a lower end side of a front wall portion 27c) when inflation has been completed is supported on the instrument panel 1 (see FIG. 12). As shown in FIGS. 4 and 6, a rear wall portion 27*d* of the communication inflation portion 27 constitutes an inner peripheral surface 50*a* of the cavity portion 50.

The upper side support inflation portion 21 has an inflation completed shape as a substantially plate shape whose longitudinal direction is substantially along the left-right direction. In the upper side support inflation portion 21, a front end 21*a* side communicates with the upper end 27*a* of the communication inflation portion 27 and the upper end 17*a* of the attachment portion 17, and a rear end 21*b* side communicates with an upper end 40*a* of the occupant protection portion 40. The upper side support inflation portion 21 is substantially orthogonal to the communication inflation portion 27 and is substantially along the front-rear direction as viewed from the left and right sides when inflation has been completed (see FIG. 2). As shown in FIG. 3, the upper side support inflation portion 21 is formed such that a portion on the front end 21*a* side communicating with the attachment portion 17 and the upper side support inflation portion 21 is narrow and a portion on the rear end 21*b* side communicating with the occupant protection portion 40 is wide. Further, the upper side support inflation portion 21 has a configuration in which a front upper surface side (a front end side of an upper wall portion 21*c*) when inflation has been completed abuts against and is supported on the windshield 4 provided above the instrument panel 1 (see FIG. 12). That is, the upper side support inflation portion 21 includes an upper side support surface portion 22 supported by the windshield 4 on the front upper surface side (the front end 21*a* side) when inflation has been completed (see FIG. 4). In the upper side support inflation portion 21, the lower wall portion 21*d* constitutes the inner peripheral surface 50*a* of the cavity portion 5 (see FIGS. 4 and 5).

Figure 8:
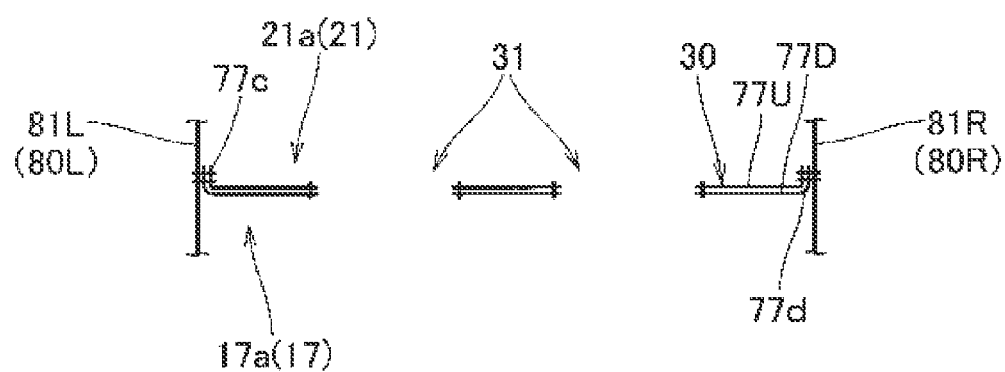
FIG. 8 is a schematic cross-sectional view showing a portion of a partition wall portion in the airbag in FIG. 1.

In the embodiment, the front end 21*a* side of the upper side support inflation portion 21 and the upper end 27*a* side of the communication inflation portion 27 are partitioned by a partition wall portion 30. The partition wall portion 30 is coupled to a wall portion constituting a boundary portion between the upper side support inflation portion 21 and the communication inflation portion 27 over an entire circumference of a peripheral edge of the partition wall portion 30 (see FIGS. 4 and 8). In the partition wall portion 30, two circularly open communication holes 31 are formed side by side in the left-right direction (see FIGS. 1, 3, 5, and 8). The upper side support inflation portion 21 and the communication inflation portion 27 communicate with each other through the communication holes 31. The partition wall portion 30 and the communication hole 31 are formed so that an inflation gas flowing through the attachment portion 17 can stably flow out to a communication inflation portion 27 side (a lower side support inflation portion 24 side) by preventing excessive outflow of the inflation gas to an upper side support inflation portion 21 side. In the embodiment, a portion of a peripheral edge of the partition wall portion 30 serving as the boundary portion between the upper side support inflation portion 21 and the communication inflation portion 27 abuts against the windshield 4 when inflation of the airbag 15 has been completed (see FIG. 12).

The lower side support inflation portion 24 has an inflation completed shape as a substantially plate shape whose longitudinal direction is substantially along the left-right direction. In the lower side support inflation portion 24, a front end 24*a* side communicates with the lower end 27*b* of the communication inflation portion 27, and a rear end 24*b* side communicates with a lower end 40*b* of the occupant protection portion 40. The lower support inflation portion 24 is substantially orthogonal to the communication inflation portion 27, is substantially along the upper side support inflation portion 21, and is substantially along the front-rear direction as viewed from the left and right sides when inflation has been completed (see FIG. 2). The lower side support inflation portion 24 has a substantially rectangular plate shape having substantially the same width dimension in a front-rear direction. Specifically, the lower side support inflation portion 24 is formed slightly inclined with respect to the upper side support inflation portion 21 such that the rear end 24*b* side is slightly closer to the upper side support inflation portion 21. The lower side support inflation portion 24 has a configuration in which a front lower surface side (the front end 24*a* side, more specifically, a vicinity of an intersection portion between the lower side support inflation portion 24 the communication inflation portion 27) when inflation has been completed abuts against and is supported on the instrument panel 1 (see FIG. 12). That is, the lower side support inflation portion 24 has a configuration in which a lower side support surface portion 25 supported by the instrument panel 1 is provided on the front end 24*a* side when inflation has been completed (see FIGS. 4 and 12). In the lower side support inflation portion 24, an upper wall portion 24*c* constitutes the inner peripheral surface 50*a* of the cavity portion 5 (see FIGS. 4 and 5). In each of a left wall portion 24*e* and a right wall portion 24*f* of the lower side support inflation portion 24, respective two vent holes 35, through which an excess inflation gas flowed into an inside is exhausted, are formed and opened in a substantially circular shape (see FIGS. 1, 2, and 4).

The occupant protection portion 40 has a shape when inflation has been completed as a substantially plate shape. The shape is substantially orthogonal to the upper side support inflation portion 21 and the lower side support inflation portion 24 and is substantially along the upper-lower direction on an occupant MP side. The occupant MP side is a rear end side when inflation has been completed. In the occupant protection portion 40, an upper end 40*a* side is communicated with the rear end 21*b* of the upper side support inflation portion 21, and a lower end 40*b* side is communicated with the rear end 24*b* of the lower side support inflation portion 24. Specifically, the occupant protection portion 40 has a substantially rectangular shape having substantially the same width dimension in an upper-lower direction. The occupant protection portion 40 is formed such that, when inflation of the airbag 15 has been completed, the upper end 40*a* side is supported on the upper side support inflation portion 21 and the lower end 40*b* side is supported on the lower side support inflation portion 24. The upper side support inflation portion 21 extends forward in a manner of being substantially orthogonal to the occupant protection portion 40 as viewed from the left and right sides. The lower side support inflation portion 24 extends forward in a manner of being substantially orthogonal to the occupant protection portion 40 as viewed from the left and right sides. In the occupant protection portion 40, a front wall portion 40*c* constitutes the inner peripheral surface 50*a* of the cavity portion 5 (see FIGS. 4 and 6). In the embodiment, as shown in FIGS. 1, 3, 4, and 6, the occupant protection portion 40 includes a central region 42 and protruding regions 43L, 43R that are formed on both left and right sides of the central region 42 and protrude rearward and outward with respect to the central region 42. The central region 42 is over substantially entire upper and lower portions of left and right central portions of the occupant protection portion 40, and the protruding regions 43L, 43R are formed on both left and right edges of the occupant protection portion 40, that is, on the left and right sides of the central region 42, respectively, over substantially entire upper and lower portions of the occupant protection portion 40 (see FIGS. 1 and 4). In the embodiment, the protruding regions 43L, 43R include an outer wall portion 43a formed continuously from a left wall portion 40e or a right wall portion 40f of the occupant protection portion 40 and an inner wall portion 43b provided on a central region 42 side, and are formed by coupling a peripheral edge 43c of the outer wall portion 43a and a peripheral edge 43d of the inner wall portion 43b to each other (see FIGS. 1 and 6).

Further, in the embodiment, the rear wall portion 42a (a portion on a center side of the rear wall portion 40d of the occupant protection portion 40 in the left-right direction) of the central region 42 of the occupant protection portion 40 constitutes a front collision restraining surface 45 that can receive and protect the head MH of the occupant MP moving forward at a time of a front collision of the vehicle. The inner wall portions 43b of the protruding regions 43L, 43R constitute oblique collision restraining surfaces 46L, 46R configured to receive and protect the head MH of the occupant MP that moves obliquely forward at a time of an oblique collision or an offset collision of the vehicle. The oblique collision restraining surfaces 46L, 46R (the inner wall portions 43b) are inclined with respect to the front-rear direction such that rear end sides of the oblique collision restraining surfaces 46L, 46R are positioned outward on left and right in a state in which the airbag 15 when inflation has been completed is viewed from an upper-lower direction side (see FIG. 6).

Figure 7:
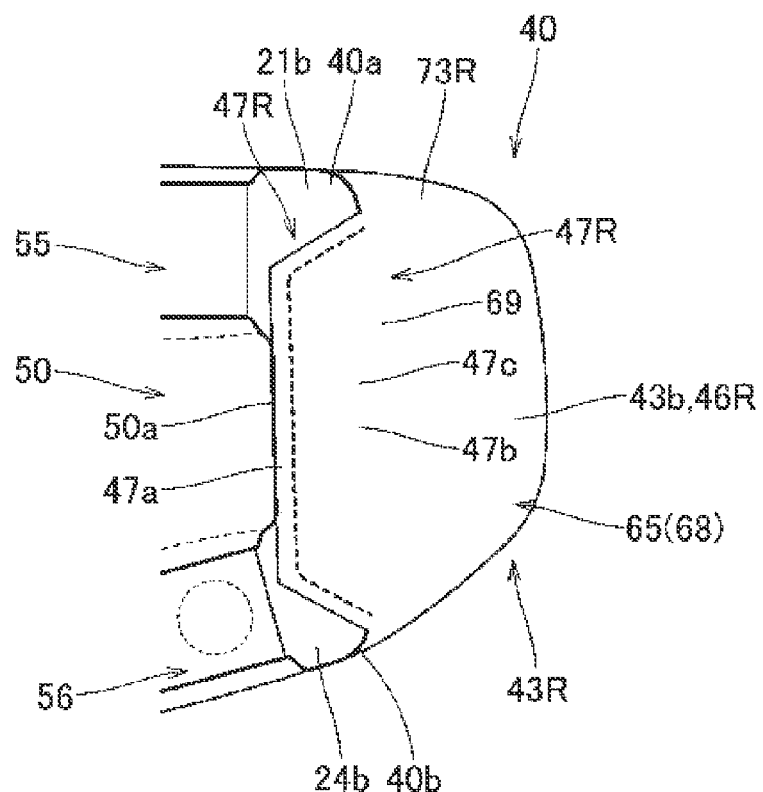
FIG. 7 is a schematic partial vertical cross-sectional view showing a portion of a restraining recess in the airbag in FIG. 1.

On a rear surface side of the occupant protection portion 40, in the embodiment, at boundary portions (boundary portions between the front collision restraining surface 45 and the oblique collision restraining surfaces 46L, 46R) between the central region 42 and the protruding regions 43L, 43R, restraining recesses 47L, 47R configured to allow the head MH of the occupant MP to enter the restraining recesses 47L, 47R and restrain the head MH are formed (see FIGS. 4, 6, and 7). The restraining recesses 47L, 47R are formed substantially along the upper-lower direction, and as shown in FIG. 4, over substantially the entire upper and lower portions of the occupant protection portion 40. Specifically, as shown in FIGS. 6 and 7, the restraining recesses 47L, 47R are recessed forward in a pocket shape by opening a rear end 47b side of the restraining recesses 47L, 47R. The restraining recesses 47L, 47R are each formed in a substantially pocket shape with the rear end 47b side opened by coupling (sewing) upper edges, lower edges, and front edges of an outer side wall 47c and an inner side wall 47d to each other (see FIGS. 4, 6, and 7). The outer side wall 47c and the inner side wall 47d have substantially rectangular shapes wide in the upper-lower direction as viewed from a left-right direction side. The restraining recesses 47L, 47R have a configuration in which a distal end (a front end 47a) of the recess is connected to an inner peripheral surface 50a side of the cavity portion 50. Specifically, the restraining recesses 47L, 47R have a configuration in which a front end 47a side is sewn (connected) to the front wall portion 40c (a main body portion 76 in an inner peripheral panel portion 75) of the occupant protection portion 40 constituting the inner peripheral surface 50a of the cavity portion 50 at a portion of a coupling portion 48 using a suture thread (see FIG. 6). The restraining recesses 47L, 47R are formed substantially along the front-rear direction in a state in which an opening on the rear end 47b side is prevented from opening such that the outer side wall 47c and the inner side wall 47d are brought into contact with each other over substantially an entire region when inflation of the airbag 15 has been completed (see FIG. 6). The restraining recesses 47L, 47R are configured to allow the head MH of the occupant MP that moves obliquely forward to enter the restraining recesses 47L, 47R and protect the head MH, and have a width dimension (a depth) in the front-rear direction that is substantially the same as a thickness of the central region 42 of the occupant protection portion 40 when inflation has been completed (see FIG. 6) and that is set to such a dimension that a region on a front side of the head MH of the occupant MP can enter the restraining recesses 47L, 47R.

Figure 5:
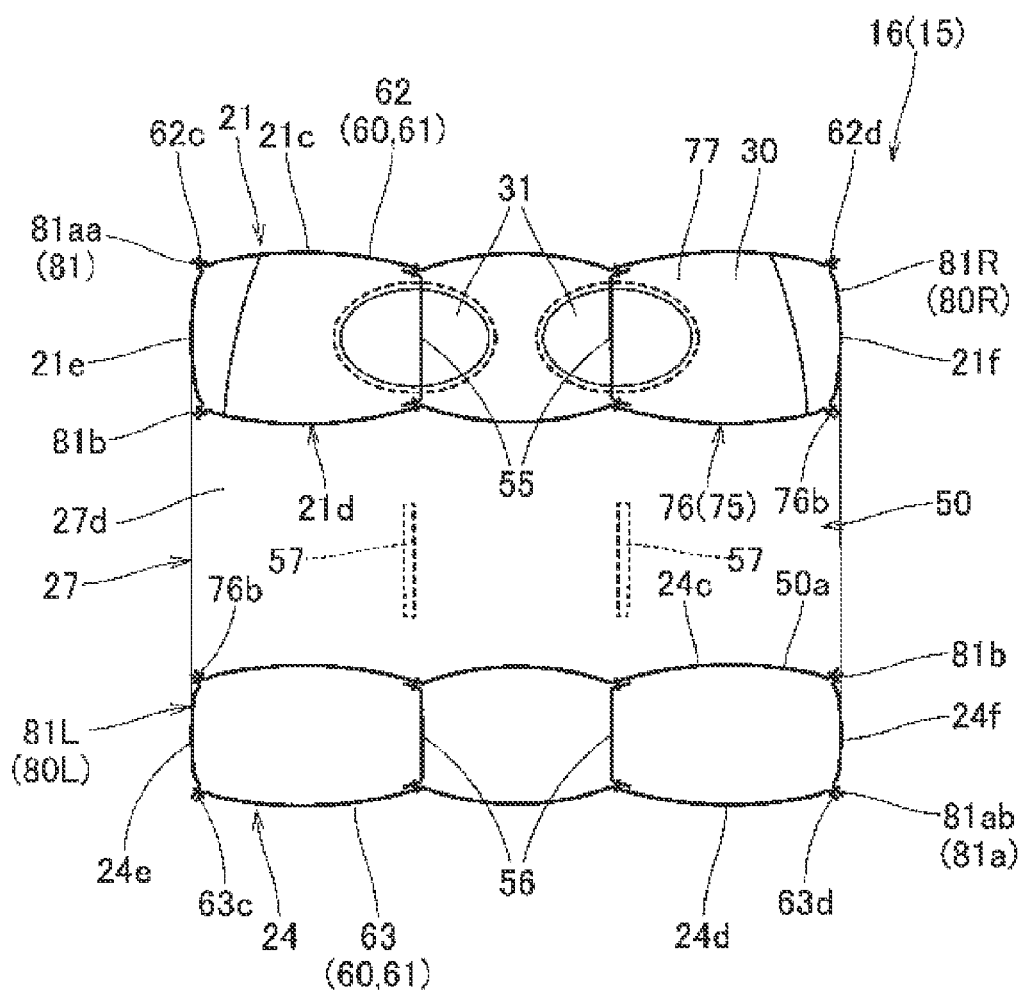
FIG. 5 is a schematic vertical cross-sectional view showing the airbag in FIG. 1 taken along a left-right direction on a front-rear center side.

In the airbag 15 according to the embodiment, as shown in FIGS. 4 to 6, the communication inflation portion 27, the upper side support inflation portion 21, and the lower side support inflation portion 24 have an inflation completed shape as a substantially plate shape by providing thickness regulation tethers 55, 56, 57 inside the communication inflation portion 27, the upper side support inflation portion 21, and the lower side support inflation portion 24. In the communication inflation portion 27, the tether 55 is formed in a band shape substantially along the upper-lower direction in a manner of connecting the front wall portion 27c and the rear wall portion 27d in a region on the upper end 27a side branching from the attachment portion 17. In the upper side support inflation portion 21, the tether 56 is formed in a band shape substantially along the front-rear direction in a manner of connecting the upper wall portion 21c and the lower wall portion 21d at an intermediate portion in the front-rear direction. In the lower side support inflation portion 24, the tether 57 is formed in a band shape substantially along the front-rear direction in a manner of connecting the upper wall portion 24c and the lower wall portion 24d at an intermediate portion in the front-rear direction. Specifically, the tether 56 provided in the upper side support inflation portion 21 and the tether 57 provided in the lower side support inflation portion 24 have a length dimension larger than that of the tether 55 provided in the communication inflation portion 27 so that a thickness dimension of the tethers 56, 57 can be widely regulated in the front-rear direction (see FIG. 4). The tethers 55, 56, 57 are arranged side by side at two positions in the left-right direction. No tether is provided in a region of the occupant protection portion 40. However, as shown in FIGS. 4 to 7, the restraining recesses 47L, 47R that extend from the rear wall portion 40d and whose distal end (the front end 47a) of the recess is connected to the front wall portion 40c also play the same role as the tethers, regulate a separation distance between the front wall portion 40c and the rear wall portion 40d, and form an inflation completed shape of the occupant protection portion 40 as a plate shape.

The airbag 15 is formed in a bag shape by coupling corresponding edge portions of a plurality of panel portions (base members) that have predetermined shapes and are formed of flexible sheet bodies to each other. Specifically, as shown in FIGS. 9 and 10, the panel portion constituting the airbag 15 includes an outer peripheral panel portion 60, the inner peripheral panel portion 75, and side wall panel portions 80L, 80R.

The outer peripheral panel portion 60 is provided on an outer peripheral surface side of the airbag 15 when inflation has been completed, and includes an occupant side panel 65 provided on the occupant MP side and a peripheral wall panel 61 constituting the vehicle body side inflation portion 16. The peripheral wall panel 61 includes an upper side panel 62 and a lower side panel 63.

Figure 9:
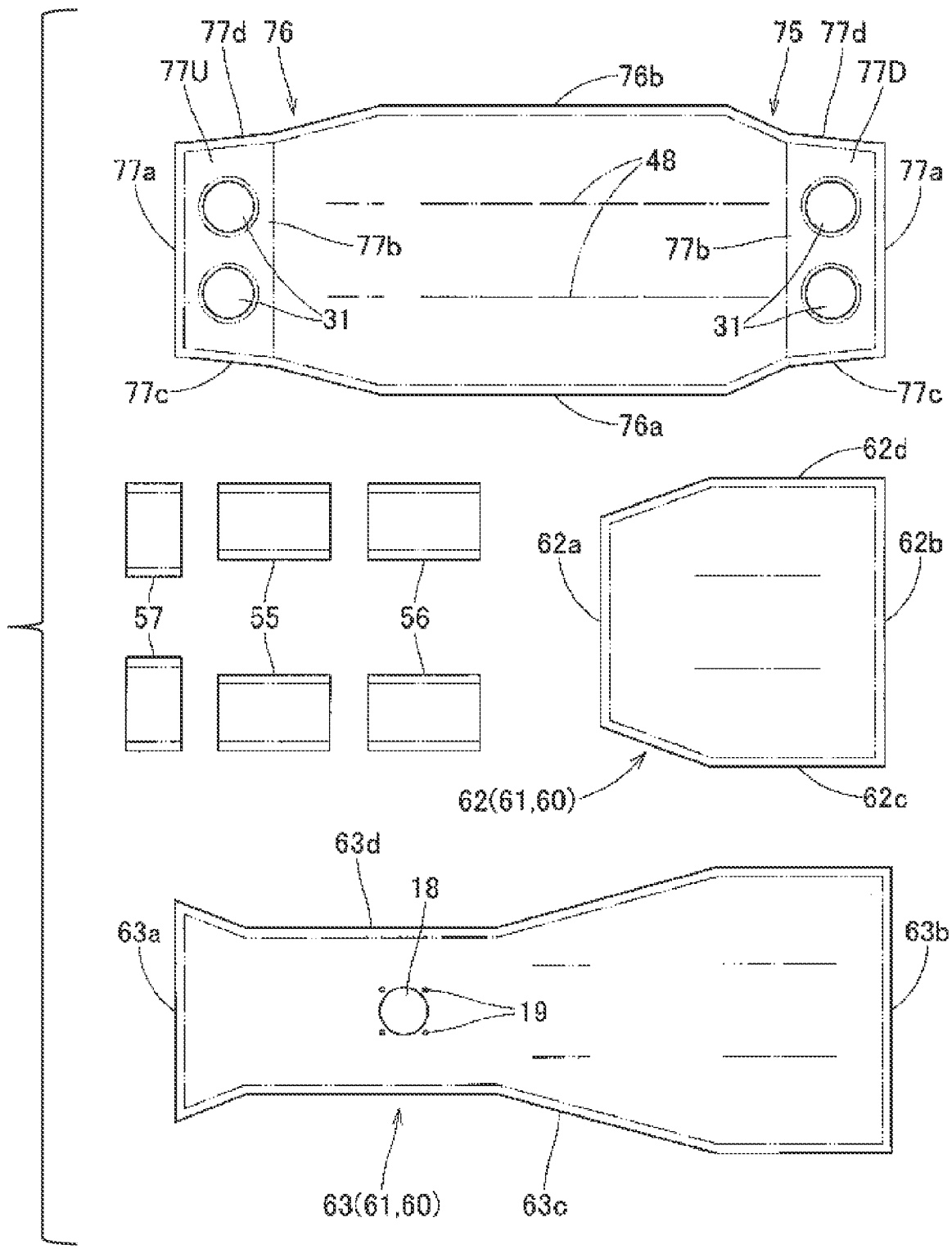
FIG. 9 is a plan view showing base fabrics constituting the airbag in FIG. 1.
Figure 10:
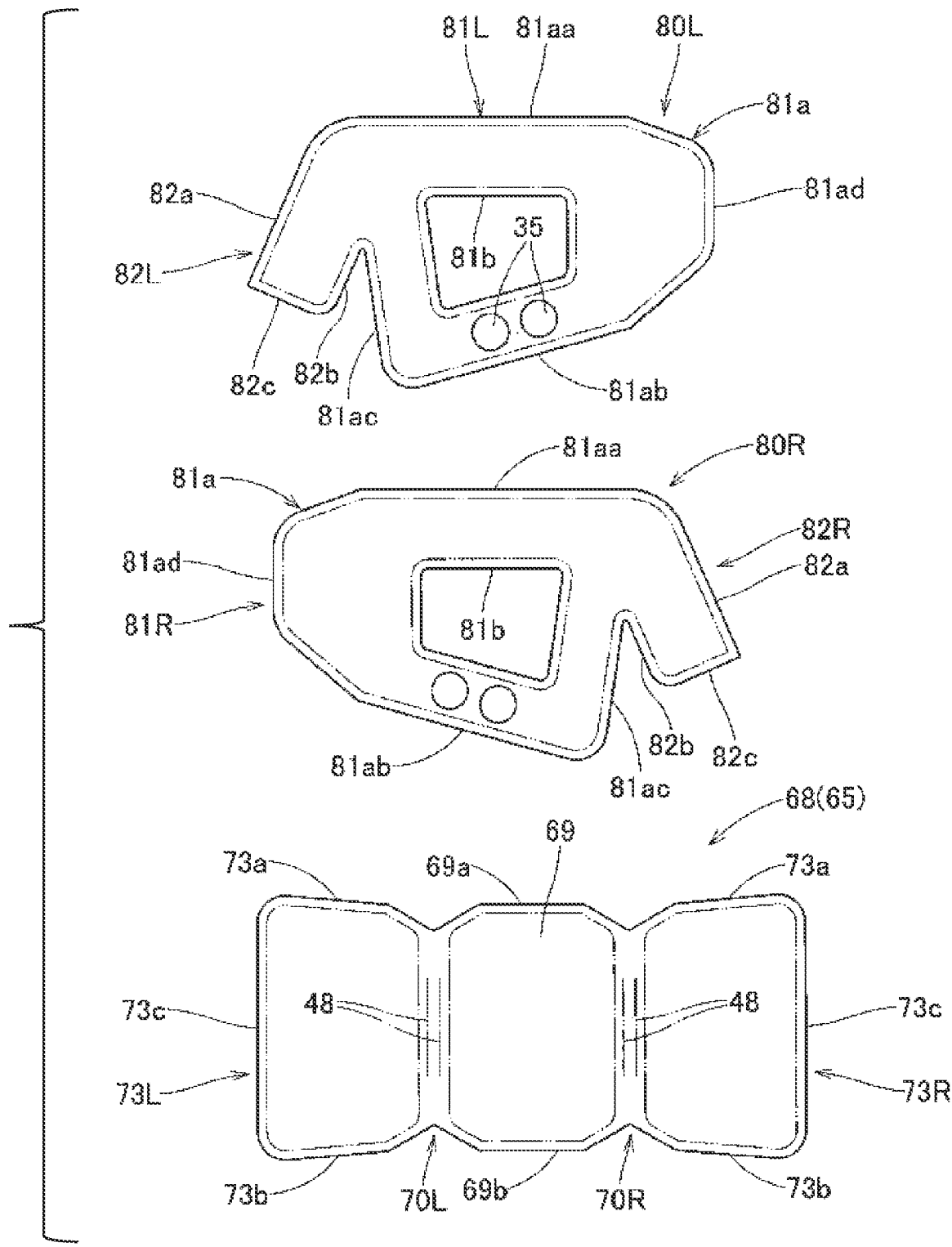
FIG. 10 is a plan view showing remaining base fabrics constituting the airbag in FIG. 1.

The upper side panel 62 constitutes the upper wall portion 21c of the upper side support inflation portion 21, and as shown in FIG. 9, has a substantially rectangular outer shape with a portion on a front end side of the upper side panel 62 slightly narrowed. The lower side panel 63 constitutes the front wall portion 17c, the lower wall portion 17e, the rear wall portion 17d, and the lower wall portion 24d of the lower side support inflation portion 24. As shown in FIG. 9, the lower side panel 63 has a substantially band shape in which a region constituting the attachment portion 17 in a vicinity of a front upper edge 63a side is narrowed. Both the upper side panel 62 and the lower side panel 63 have a symmetrical shape in the left-right direction.

Figure 11A:
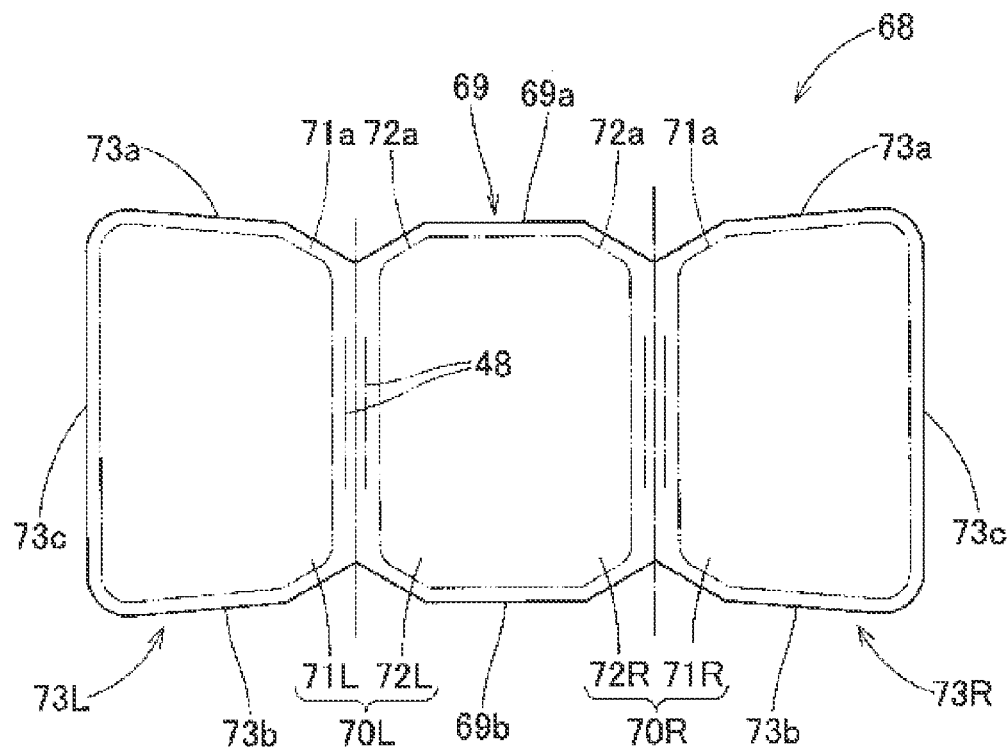
FIGS. 11A and 11B are plan views showing an occupant side panel base member and an occupant side panel in the base fabrics constituting the airbag in FIG. 1.
Figure 11B:
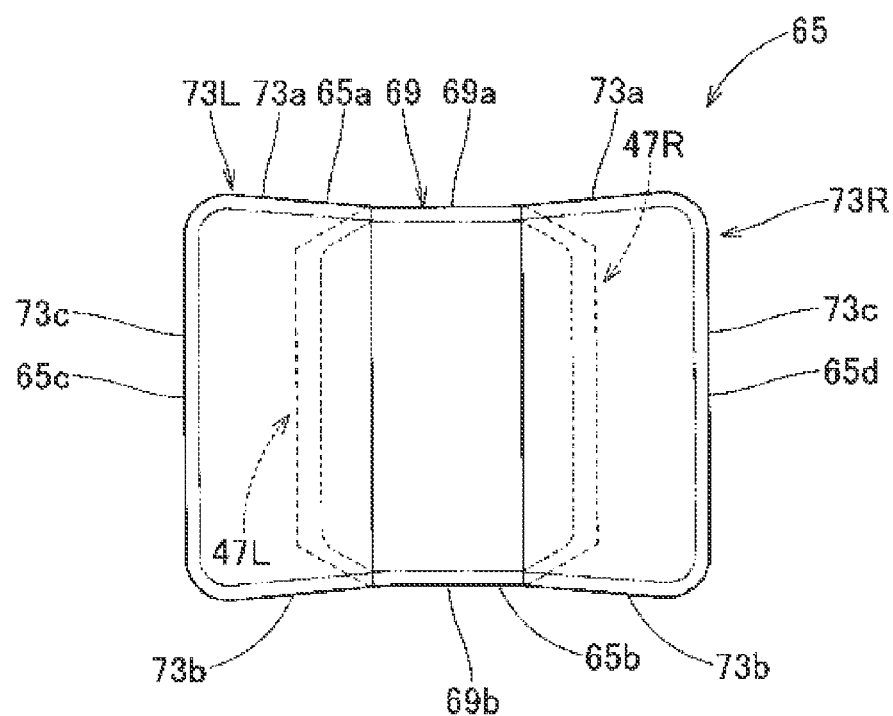

In the occupant protection portion 40, the occupant side panel 65 constitutes the rear wall portion 40d provided on the occupant MP side, and constitutes portions extending from the inner wall portions 43b (the oblique collision restraining surfaces 46L, 46R) in the protruding regions 43L, 43R to the rear wall portion 42a (the front collision restraining surface 45) of the central region 42 via the restraining recesses 47L, 47R. More specifically, the occupant side panel 65 is formed of an occupant side panel base member 68 shown in FIGS. 10 and 11A. The occupant side panel base member 68 is a substantially band-shaped structure in which protruding region constituent portions 73L, 73R constituting the inner wall portions 43b of the protruding regions 43L, 43R, recess constituent portions 70L, 70R constituting the restraining recesses 47L, 47R, and a central region constituent portion 69 constituting the rear wall portion 42a of the central region 42 are arranged side by side. The recess constituent portions 70L, 70R includes outer wall constituent portions 71L, 71R and inner wall constituent portions 72L, 72R constituting the outer side wall 47c and inner side wall 47d of the restraining recesses 47L, 47R, respectively. The recess constituent portions 70L, 70R have an outer shape such that the outer wall constituent portions 71L, 71R and the inner wall constituent portions 72L, 72R are connected at a front end side thereof by connecting a rear end side thereof to the central region constituent portion 69 or the protruding region constituent portions 73L, 73R. Further, the recess constituent portions 70L, 70R are folded in half such that the outer wall constituent portions 71L, 71R and the inner wall constituent portions 72L, 72R overlap each other, and can form the restraining recesses 47L, 47R by coupling the peripheral edges 71a, 72a to each other (see FIG. 11B). Further, as shown in FIG. 11B, the occupant side panel 65 is formed such that the restraining recesses 47L, 47R are formed in the occupant side panel base member 68. Both the occupant side panel base member 68 and the occupant side panel 65 have a symmetrical shape in the left-right direction.

The occupant side panel 65 formed in this way is formed with, on an upper edge 65a side and a lower edge 65b side, concave portions 66U, 66D such that the central region constituent portion 69 (a central portion) constituting the rear wall portion 42a of the central region 42 is recessed with respect to the protruding region constituent portions 73L, 73R (protruding side portions) constituting the inner wall portions 43b of the protruding regions 43L, 43R. In the occupant side panel 65, the central region constituent portion 69 has a substantially rectangular shape that is wide in the upper-lower direction. Each of the protruding region constituent portions 73L, 73R has a substantially trapezoidal shape that is slightly expanded in the upper-lower direction toward an outer edge 73c away from the central region constituent portion 69. The protruding region constituent portions 73L, 73R are provided adjacent to the central region constituent portion 69 via the restraining recesses 47L, 47R. That is, a width dimension of the central region constituent portion 69 in the upper-lower direction is set smaller than a width dimension of the outer edge 73c side of the protruding region constituent portions 73L, 73R in the upper-lower direction. The upper edge 73a and the lower edge 73b of the protruding region constituent portions 73L, 73R are inclined in a manner of approaching each other toward the central region constituent portion 69. Further, shapes of the upper edges 69a, 73a or the lower edges 69b, 73b of the central region constituent portion 69 and the protruding region constituent portions 73L, 73R constitute the concave portions 66U, 66D. Specifically, the width dimension of the central region constituent portion 69 in the upper-lower direction is set smaller than the width dimension of the outer edge 73c side of the protruding region constituent portions 73L, 73R in the upper-lower direction. Further, the upper edge 73a and the lower edge 73b of the protruding region constituent portions 73L, 73R are inclined such that the upper edge 73a and the lower edge 73b get closer to each other toward the central region constituent portion 69 (see FIG. 11B). In the present embodiment, the occupant side panel 65 also has a symmetrical shape in the upper-lower direction.

The inner peripheral panel portion 75 is provided on an inner peripheral surface side of the airbag 15 when inflation has been completed, and as shown in FIG. 9, includes the main body portion 76 and partition wall constituent portions 77U, 77D that are provided on both front and rear end sides of the main body portion 76 and constitute the partition wall portion 30. The inner peripheral panel portion 75 is formed of a band-shaped body having a symmetrical shape in the left-right direction. The main body portion 76 of the inner peripheral panel portion 75 constitutes the lower wall portion 21d of the upper side support inflation portion 21, the front wall portion 40c of the occupant protection portion 40, the upper wall portion 24c of the lower side support inflation portion 24, and the rear wall portion 27d of the communication inflation portion 27. That is, the main body portion 76 of the inner peripheral panel portion 75 constitutes the inner peripheral surface 50a of the cavity portion 50.

The pair of left and right side wall panel portions 80L, 80R constitute left and right side surfaces of the airbag 15 when inflation has been completed, and as shown in FIG. 10, include substantially square annular side wall constituent portions 81L, 81R and substantially rectangular attachment portion constituent portions 82L, 82R extending from front upper end sides of the side wall constituent portions 81L, 81R, respectively. The side wall constituent portion 81L of the side wall panel portion 80L constitutes the left wall portion 21e of the upper side support inflation portion 21, the left wall portion 24e of the lower side support inflation portion 24, the left wall portion 27e of the communication inflation portion 27, and the left wall portion 40e of the occupant protection portion 40. The side wall constituent portion 81R of the side wall panel portion 80R constitutes the right wall portion 21f of the upper side support inflation portion 21, the right wall portion 24f of the lower side support inflation portion 24, the right wall portion 27f of the communication inflation portion 27, and the right wall portion 40f of the occupant protection portion 40. The attachment portion constituent portions 82L, 82R in the side wall panel portions 80L, 80R constitute a left wall portion 17f and a right wall portion 17g of the attachment portion 17, respectively.

In the embodiment, the outer peripheral panel portion 60 (the upper side panel 62, the lower side panel 63, and the occupant side panel base member 68), the inner peripheral panel portion 75, the side wall panel portions 80L, 80R, and the tethers 55, 56, 57, which constitute the airbag 15, are each formed of a flexible woven fabric formed of polyester yarn, polyamide yarn, or the like.

As shown in FIGS. 4 to 10, the airbag 15 according to the embodiment is formed into a bag shape by sewing (coupling), using a sewing thread, corresponding edge portions of the upper side panel 62, the lower side panel 63, and the occupant side panel 65 (the occupant side panel base member 68) in the outer peripheral panel portion 60, the inner peripheral panel portion 75, and the side wall panel portions 80L, 80R.

Specifically, a front edge 62*a* of the upper side panel 62 is coupled to the front upper edge 63*a* of the lower side panel 63 and front edges 77*a* of the partition wall constituent portions 77U, 77D of the inner peripheral panel portion 75. A rear edge 62*b* of the upper side panel 62 is coupled to the upper edge 65*a* (the upper edge 69*a* of the central region constituent portion 69, the upper edges 73*a* of the protruding region constituent portion 73L, 73R, and the concave portion 66U) of the occupant side panel 65. A left edge 62*c* of the upper side panel 62 is coupled to an upper edge 81*aa* (a part of the outer peripheral edge 81*a*) of the side wall constituent portion 81L in the side wall panel portion 80L, and a right edge 62*d* of the upper side panel 62 is coupled to the upper edge 81*aa* (a part of the outer peripheral edge 81*a*) of the side wall constituent portion 81R in the side wall panel portion 80R. A rear edge 63*b* of the lower side panel 63 is coupled to the lower edge 65*b* (the lower edge 69*b* of the central region constituent portion 69, the lower edges 73*b* of the protruding region constituent portions 73L, 73R, and the concave portion 66D) of the occupant side panel 65. A left edge 63*c* of the lower side panel 63 is coupled to a front edge 82*a*, a lower edge 82*c*, and a rear edge 82*b* of the attachment portion constituent portion 82L in the side wall panel portion 80L, and a front edge 81*ac* and a lower edge 81*ab* (a part of the outer peripheral edge 81*a*) of the side wall constituent portion 81L in the side wall panel portion 80L. Similarly, a right edge 63*d* of the lower side panel 63 is coupled to the front edge 82*a*, the lower edge 82*c*, and the rear edge 82*b* of the attachment portion constituent portion 82R in the side wall panel portion 80R, and the front edge 81*ac* and the lower edge 81*ab* (a part of the outer peripheral edge 81*a*) of the side wall constituent portion 81R in the side wall panel portion 80R. A left edge 65*c* and a right edge 65*d* (the outer edges 73*c* of the protruding region constituent portions 73L, 73R) of the occupant side panel 65 are coupled to rear edges 81*ad* (a part of the outer peripheral edge 81*a*) of the side wall constituent portions 81L, 81R in the side wall panel portions 80L, 80R, respectively. A left edge 76*a* and a right edge 76*b* of the main body portion 76 in the inner peripheral panel portion 75 are coupled to inner peripheral edges 81*b* of the side wall constituent portions 81L, 81R in the side wall panel portions 80L, 80R, respectively. Rear edges 77*b* of the partition wall constituent portions 77U, 77D in the inner peripheral panel portion 75 are coupled to each other. Left edges 77*c* and right edges 77*d* are respectively coupled to regions of the front upper end sides of the side wall constituent portions 81L, 81R in the side wall panel portions 80L, 80R in a state in which the left edges 77*c* and the right edges 77*d* are overlapped with each other (see FIG. 8).

In the front passenger seat airbag device M according to the embodiment, the airbag 15 with the retainer 9 stored therein is stored in the case 12 in a state in which the airbag 15 is folded to be stored in the case 12 and a periphery of the airbag 15 is wrapped in a breakable wrapping sheet (not shown), and the inflator 8 is connected to the case 12 together with the peripheral edge of the inflow opening 18 of the airbag 15 using the retainer 9. Thereafter, when the case 12 holding the folded airbag 15 and the inflator 8 is connected to the airbag cover 6 formed on the instrument panel 1 mounted on the vehicle, the front passenger seat airbag device M can be mounted on the vehicle.

In the front passenger seat airbag device M according to the embodiment, the inflator 8 operates at a time of a front collision, an oblique collision, or an offset collision of the vehicle in a state in which the front passenger seat airbag device M is mounted on the vehicle. Then, the airbag 15 inflates by flowing an inflation gas therein, protrudes from the case 12, and completes inflation in a state as shown in FIGS. 12 and 13.

In the airbag 15 according to the embodiment, the cavity portion 50 is formed in a manner of penetrating the airbag 15 substantially along the left-right direction between the attachment portion 17 provided on the front end side of the airbag 15 when inflation has been completed and the occupant protection portion 40 provided on the rear end side of the airbag 15 when inflation has been completed. In other words, in the airbag 15 according to the embodiment, in a cross section substantially along the front-rear direction when inflation has been completed, the occupant protection portion 40 is separated from an attachment portion 17 side (in the embodiment, the attachment portion 17 and the communication inflation portion 27) and independently inflates in a substantially plate shape substantially along the left-right direction by interposing the cavity portion 50 between the attachment portion 17 and the occupant protection portion 40 (see FIG. 13). Further, the occupant side panel 65 constituting the occupant side surface (the rear wall portion 40*d*) of the occupant protection portion 40 is formed such that the upper edge 65*a* and the lower edge 65*b* are recessed toward a central side. In other words, the occupant side panel 65 is formed such that a length dimension of the central region 42 (the central region constituent portion 69) in the upper-lower direction is relatively small and length dimensions of the protruding regions 43L, 43R (the protruding region constituent portions 73L, 73R) formed on a left edge 65*c* side and a right edge 65*d* side in the upper-lower direction are relatively large. The occupant side panel 65 has a configuration in which the upper edge 65*a* and the lower edge 65*b*, which are formed by recessing the central side, are coupled to corresponding ends (the rear edges 62*b*, 63*b* of the upper side panel 62 and the lower side panel 63) of the peripheral wall panel 61. Therefore, when inflation has been completed, the central region 42 of the occupant protection portion 40 is formed such that a film length of the central region 42 in the upper-lower direction is set shorter than film lengths of the protruding regions 43L, 43R formed on a left edge side and a right edge side of the occupant protection portion 40. Due to this difference in film length, the protruding regions 43L, 43R protrude obliquely rearward and outward with respect to the central region 42. More specifically, since the airbag 15 according to the embodiment has an annular shape with the cavity portion 50 penetrating the airbag 15 substantially along the left-right direction, an outer peripheral panel portion 60 side is more likely to inflate in a direction away from the cavity portion 50 than the inner peripheral panel portion 75 on a cavity portion 50 side when inflation has been completed. Since the occupant protection portion 40 is formed of a portion on a rear portion side of an annular inflation portion surrounding the cavity portion 50 penetrating the airbag 15 in the left-right direction when inflation has been completed, in the occupant protection portion 40, the occupant side panel 65 provided on the outer peripheral surface side is likely to inflate outward. At that time, the protruding regions 43L, 43R formed on the left and right edge sides of the occupant protection portion 40 are likely to inflate rearward and outward since the protruding regions 43L, 43R are set to have longer upper and lower film lengths (film lengths from a coupling portion) than the central region 42. Therefore, the protruding regions 43L, 43R inflate rearward and outward. Therefore, simply by setting an outer shape of the rear edges 81ad of the side wall panel portions 80L, 80R and an outer shape of the left edge 65c and the right edge 65d (the protruding region constituent portions 73L, 73R) in the occupant side panel 65 in a manner of increasing film lengths thereof in the upper-lower direction, a protruding state of the protruding regions 43L, 43R with respect to the central region 42 can be maintained stably without separately providing a separate member. Further, even if the occupant MP moves obliquely forward at a time of an oblique collision or an offset collision of the vehicle, the occupant MP can be accurately protected by the protruding regions 43L, 43R protruding obliquely rearward and outward with respect to the central region 42.

Therefore, in the airbag 15 according to the present disclosure, it is possible to accurately protect the occupant MP with a simple configuration.

In the airbag 15 according to the embodiment, the cavity portion 50 is formed in a manner of penetrating the airbag 15 substantially along the left-right direction between the attachment portion 17 provided on the front end side of the airbag 15 when inflation has been completed and the occupant protection portion 40 provided on the rear end side of the airbag 15 when inflation has been completed. Therefore, as compared with a case in which the cavity portion 50 is not formed, a volume of a region that inflates by actually flowing an inflation gas into an inside of the region can be reduced, a size of the inflator 8 to be used can be reduced, and the entire device mounted on the vehicle can be made compact.

Further, in the airbag 15 according to the embodiment, the occupant side panel 65 has a configuration in which both the upper edge 65a and the lower edge 65b are coupled to the corresponding ends (the rear edges 62b, 63b of the upper side panel 62 and the lower side panel 63) of the peripheral wall panel 61, and has a concave shape (has the concave portions 66U, 66D). Therefore, the protruding regions 43L, 43R can stably protrude rearward and outward over substantially the entire upper and lower portions when inflation has been completed. If this point is not taken into consideration, the occupant side panel may be formed such that only one of the upper edge and the lower edge is concave. Further, the occupant side panel may not be separated from the peripheral wall panel, one of the upper edge side and the lower edge side may be separated from the peripheral wall panel, and the occupant side panel may be continuous from the peripheral wall panel.

Furthermore, in the airbag 15 according to the embodiment, since the protruding regions 43L, 43R are formed on both the left and right sides of the central region 42, the portion (the oblique collision restraining surfaces 46L, 46R) configured to receive the occupant MP that moves obliquely forward at a time of an oblique collision or an offset collision of the vehicle can be formed on both the left and right sides, and the occupant MP that moves obliquely forward to left and obliquely forward to right can be accurately protected. If this point is not taken into consideration, the protruding region may be formed on only one of the left and right sides.

Furthermore, in the airbag 15 according to the embodiment, the restraining recesses 47L, 47R are formed inside the occupant protection portion 40 as a tether that connects a vicinity of the boundary portions between the protruding regions 43L, 43R and the central region 42 and the inner peripheral panel portion 75 (the front wall portion 40c of the occupant protection portion 40) on the cavity portion 50 side. Therefore, a protruding shape (a protruding state with respect to the central region 42) of the protruding regions 43L, 43R can be further stabilized. If this point is not taken into consideration, a tether that extends from the vicinity of the boundary portion between the protruding regions and the central region and is connected to the inner peripheral panel portion on the cavity portion side may not be provided inside the occupant protection portion. In the embodiment, the tether is formed from the restraining recess. However, a separate tether that connects the vicinity of the boundary portion between the protruding regions and the central region and the inner peripheral panel portion on the cavity portion side may be provided without forming the restraining recess.

In particular, in the airbag 15 according to the embodiment, restraining recesses 47L, 47R whose rear end 47b side is opened and that are recessed in a pocket shape are formed as the tether that connects the vicinity of the boundary portions between the protruding regions 43L, 43R and the central region 42 and the inner peripheral panel portion 75 (the front wall portion 40c of the occupant protection portion 40) on the cavity portion 50 side. In other words, the restraining recesses 47L, 47R are formed at the boundary portions between the front collision restraining surface 45 and the oblique collision restraining surfaces 46L, 46R. Therefore, at a time of an oblique collision or an offset collision of the vehicle, the head MH of the occupant MP that moves obliquely forward can enter the restraining recesses 47L, 47R while being received by the oblique collision restraining surfaces 46L, 46R, and the head MH of the occupant MP can be accurately protected (see FIG. 14). In a front collision, the occupant MP that moves forward can be accurately protected by the rear wall portion 42a (the front collision restraining surface 45) of the central region 42 (see FIG. 13). Further, in the airbag 15 according to the embodiment, the cavity portion 50 that penetrates the airbag 15 in the left-right direction is formed. In a cross section substantially along the front-rear direction when inflation has been completed, the occupant protection portion 40 is separated from the attachment portion 17 side and independently inflates in a substantially plate shape substantially along the left-right direction. The upper end 40a side and the lower end 40b side are supported by the upper side support inflation portion 21 and the lower side support inflation portion 24 that are provided substantially along the front-rear direction, and the upper side support inflation portion 21 and the lower side support inflation portion 24 are respectively supported by the windshield 4 and the instrument panel 1 (see FIG. 12). Therefore, the occupant protection portion 40 can be accurately supported by the upper side support inflation portion 21 and the lower side support inflation portion 24. Even in the configuration in which the cavity portion 50 is formed at the intermediate portion, the occupant MP that moves forward can be stably restrained by the occupant protection portion 40.

Further, in the airbag 15 according to the embodiment, in a cross section substantially along the front-rear direction when inflation has been completed, the occupant protection portion 40 is separated from the attachment portion 17 side (in the embodiment, the attachment portion 17 and the communication inflation portion 27) and independently inflates in a substantially plate shape substantially along the left-right direction by interposing the cavity portion 50 between the attachment portion 17 and the occupant protection portion 40. The distal ends (the front ends 47*a*) of the recesses in the restraining recesses 47L, 47R formed in the occupant protection portion 40 is directly connected to the inner peripheral surface 50*a* side (in the present embodiment, the front wall portion 40*c* of the occupant protection portion 40) of the cavity portion 50. Therefore, a concave shape of the restraining recesses 47L, 47R when inflation has been completed can be stably maintained. A depth of recesses of the restraining recesses 47L, 47R required for the head MH of the occupant MP to enter the restraining recesses 47L, 47R and to be restrained can be secured. Further, in the airbag 15 according to the present embodiment, even if a portion of the peripheral edge of the restraining recesses 47L, 47R in which the head MH of the occupant MP has entered and has been restrained is bottomed, in front of the occupant protection portion 40, the cavity portion 50 surrounded by the inflation portion is formed. Since the distal ends (the front ends 47*a*) of the recesses of the restraining recesses 47L, 47R are connected to the inner peripheral surface 50*a* side of the cavity portion 50, the inner peripheral surface 50*a* of the cavity portion 50, with which the portion of the peripheral edge of the restraining recesses 47L, 47R is to be bottomed, is in a state of generating tension that acts when the airbag 15 is inflated. Accordingly, entering of the head MH of the occupant MP into the cavity portion 50 in that state and a certain reaction force can be secured, and the head MH of the occupant MP can be received with good cushioning. As a result, even in a configuration in which the cavity portion 50 is formed, when inflation of the airbag 15 has been completed, the head MH of the occupant MP that moves forward can be smoothly protected by entering the restraining recesses 47L, 47R.

Therefore, in the airbag 15 according to the embodiment, even if the airbag 15 is formed with the cavity portion 50 at an intermediate portion of the airbag 15, the head MH of the occupant MP can be accurately restrained by the restraining recesses 47L, 47R formed on the rear surface side.

In the airbag 15 according to the embodiment, the cavity portion 50 is formed in a manner of penetrating the airbag 15 substantially along the left-right direction between the attachment portion 17 provided on the front end side of the airbag 15 when inflation has been completed and the occupant protection portion 40 provided on the rear end side of the airbag 15 when inflation has been completed. Therefore, as compared with a case in which the cavity portion is not formed, the volume of the region that inflates by actually flowing an inflation gas into an inside of the region can be reduced, the size of the inflator 8 to be used can be reduced, and the entire device mounted on the vehicle can be made compact.

Further, in the airbag 15 according to the embodiment, the occupant protection portion 40 supported by the upper side support inflation portion 21 and the lower side support inflation portion 24 at the upper end 40*a* side and the lower end 40*b* side can receive the occupant MP that moves forward. The upper side support inflation portion 21 and the lower side support inflation portion 24 communicate with each other by the communication inflation portion 27 constituting the front surface side of the cavity portion 50. In other words, since the upper side support inflation portion 21 and the lower side support inflation portion 24 are connected via the communication inflation portion 27, it is possible to prevent the front ends 21*a*, 24*a* from approaching or separating from each other, and it is possible to accurately support the occupant protection portion 40. Therefore, even in a configuration in which the cavity portion 50 is formed at the intermediate portion, the occupant MP that moves forward can be stably restrained by the occupant protection portion 40. If this point is not taken into consideration, the upper side support inflation portion and the lower side support inflation portion may be directly communicated with each other on the front end side without communicating with each other via the communication inflation portion (an opening shape of the cavity portion may be substantially triangular), and the upper side support inflation portion and the lower side support inflation portion that support the upper end side and the lower end side of the occupant protection portion may not be provided.

Furthermore, in the airbag 15 according to the embodiment, the upper side support inflation portion 21 includes an upper side support surface portion 22 that is provided on the front end 21*a* side and is supported by the windshield 4 provided above the instrument panel 1 when inflation has been completed, and the lower side support inflation portion 24 includes the lower side support surface portion 25 that is provided on the front end 24*a* side and is supported by the instrument panel 1 when inflation has been completed. Therefore, when inflation has been completed, the front end 21*a* of the upper side support inflation portion 21 and the front end 24*a* of the lower side support inflation portion 24 can be stably supported by members on a vehicle body side, and the occupant MP that moves forward can be more stably restrained by the occupant protection portion 40. In particular, in the airbag 15 according to the embodiment, the upper end 17*a* side of the attachment portion 17 is also supported by the windshield 4 in a manner of being continuous from the front end 21*a* side (the upper side support surface portion 22) of the upper side support inflation portion 21, and the lower portion front surface side (the lower end side of the front wall portion 27*c*) of the communication inflation portion 27 is also supported by the instrument panel 1 in a manner of being continuous from the front end 24*a* side (the lower side support surface portion 25) of the lower side support inflation portion 24. Therefore, when inflation has been completed, the upper end 17*a* side of the attachment portion 17 and the lower front surface side of the communication inflation portion 27 can be supported by abutting against the instrument panel 1 and the windshield 4 in a wide area. If this point is not taken into consideration, the airbag may be formed such that the front end sides of the upper side support inflation portion and the lower side support inflation portion are not supported by the members on the vehicle body side when inflation has been completed.

Furthermore, in the airbag 15 according to the embodiment, the cavity portion 50 opens in a substantially square shape as viewed from the left and right sides when inflation has been completed. Therefore, the occupant protection portion 40 can be provided substantially along the upper-lower direction, and the communication inflation portion 27 that communicates the upper side support inflation portion 21 and the lower side support inflation portion 24 can also be formed in a plate shape substantially along the occupant protection portion 40 and substantially along the upper-lower direction. Therefore, when inflation has been completed, the upper side support inflation portion 21 and the lower side support inflation portion 24 can stably regulate the front ends 21*a*, 24*a* from approaching or separating from each other. Therefore, the upper end 40*a* side and the lower end 40*b* side of the occupant protection portion 40 can be supported more stably by the upper side support inflation portion 21 and the lower side support inflation portion 24.

The occupant protection portion 40 when inflation has been completed can be provided stably and widely in the upper-lower direction. If this point is not taken into consideration, the airbag may be formed with the opening shape of the cavity portion being triangular, circular, or polygonal.

In particular, in the airbag 15 according to the embodiment, as viewed from the left and right sides when inflation has been completed, the upper side support inflation portion 21 and the lower side support inflation portion 24 are provided substantially along the front-rear direction in a manner of being substantially orthogonal to the occupant protection portion 40 and the communication inflation portion 27. The occupant protection portion 40 and the communication inflation portion 27 are provided substantially along the upper-lower direction. That is, in the airbag 15 according to the embodiment, the upper side support inflation portion 21 and the lower side support inflation portion 24 are provided substantially along an entering direction of the head portion MH of the occupant MP (see FIG. 12). Therefore, when the occupant protection portion 40 that receives the head MH (an upper body) of the occupant MP is pressed forward, the occupant protection portion 40 is buckled, so that kinetic energy of the occupant heading forward can be stably absorbed.

In the airbag 15 according to the embodiment, in the occupant protection portion 40, the region between the restraining recesses 47L, 47R (the rear wall portion 42a of the central region 42) serves as the front collision restraining surface 45, and is configured to receive and protect the occupant MP that moves forward at a time of a front collision (see FIG. 13). The protruding regions 43L, 43R are formed on left and right outer sides of the restraining recesses 47L, 47R in a manner of protruding rearward and outward from the central region 42. The inner wall portions 43b in the protruding regions 43L, 43R constitute the oblique collision restraining surfaces 46L, 46R that can receive and protect the head MH of the occupant MP moving obliquely forward. Therefore, at a time of an oblique collision or an offset collision of the vehicle, the head MH of the occupant MP that moves obliquely forward can enter the restraining recesses 47L, 47R while being received by the oblique collision restraining surfaces 46L, 46R, and the head MH of the occupant MP can be accurately protected (see FIG. 14).

What is claimed is:

1. A front passenger seat airbag that is folded and stored in a storage portion provided in an instrument panel provided in front of an occupant seated in a front passenger seat, and is configured to inflate so as to protrude toward a vehicle rear side by flowing an inflation gas therein to protect the occupant, the front passenger seat airbag comprising:
   a plurality of panel portions formed of flexible sheet bodies;
   an attachment portion that is a bag-shaped structure formed by coupling corresponding edge portions of the plurality of panel portions to each other, is provided on a front end side when inflation has been completed, and is attached to the storage portion;
   an occupant protection portion that is provided on a rear end side when inflation has been completed, and is configured to protect the occupant; and
   a cavity portion that is formed at an intermediate portion between the attachment portion and the occupant protection portion in a manner of penetrating the front passenger seat airbag substantially along a left-right direction, and is surrounded by an inflation portion,
   wherein at least one of a left edge side and a right edge side of the occupant protection portion when inflation has been completed is formed with a protruding region protruding rearward and outward with respect to a central region,
   wherein the plurality of panel portions includes:
      a pair of side wall panel portions whose outer shape is substantially annular and that form left and right side surfaces when inflation has been completed;
      an outer peripheral panel portion that is provided on an outer peripheral surface side when inflation has been completed, and whose left edge side and right edge side are coupled to an outer peripheral edge of each of the side wall panel portions; and
      an inner peripheral panel portion that is provided on an inner peripheral surface side when inflation has been completed, and whose left edge side and right edge side are coupled to an inner peripheral edge of each of the side wall panel portions,
   wherein the outer peripheral panel portion includes an occupant side panel provided on an occupant side and a peripheral wall panel,
   wherein at least one of upper and lower edges of the occupant side panel is coupled to an end of the peripheral wall panel,
   wherein the outer peripheral panel portion is a concave portion such that, in a state in which at least one of the upper and lower edges coupled to the end is flatly deployed, a central portion constituting the central region is recessed with respect to a protruding side portion constituting the protruding region,
   wherein the protruding region is formed by coupling a left edge or a right edge of the occupant side panel to a rear edge of the corresponding side wall panel portion,
   wherein the protruding region protrudes with respect to the central region, and
   wherein the central region is configured to be positioned opposite a head of the occupant when inflation has been completed, and restraining recesses which are recessed toward a vehicle front side are formed on both sides of the central region.

2. The front passenger seat airbag according to claim 1, wherein both an upper edge and a lower edge of the occupant side panel are coupled to a corresponding end of the peripheral wall panel to form a concave portion.

3. The front passenger seat airbag according to claim 2, wherein the protruding region is formed on both left and right sides of the central region.

4. The front passenger seat airbag according to claim 3, wherein the occupant protection portion internally includes a tether that connects a vicinity of a boundary portion between the protruding region and the central region to the inner peripheral panel portion on a cavity portion side.

5. The front passenger seat airbag according to claim 2, wherein the occupant protection portion internally includes a tether that connects a vicinity of a boundary portion between the protruding region and the central region to the inner peripheral panel portion on a cavity portion side.

6. The front passenger seat airbag according to claim 1, wherein the protruding region is formed on both left and right sides of the central region.

7. The front passenger seat airbag according to claim 6, wherein the occupant protection portion internally includes a tether that connects a vicinity of a boundary portion between the protruding region and the central region to the inner peripheral panel portion on a cavity portion side.

8. The front passenger seat airbag according to claim 1, wherein the occupant protection portion internally includes a tether that connects a vicinity of a boundary portion between the protruding region and the central region to the inner peripheral panel portion on a cavity portion side.

9. A front passenger seat airbag that is folded and stored in a storage portion provided in an instrument panel provided in front of an occupant seated in a front passenger seat, is a bag-shaped structure formed of a flexible sheet body, and is configured to inflate so as to protrude toward a vehicle rear side by flowing an inflation gas therein to protect the occupant, the front passenger seat airbag comprising:
- an attachment portion that is provided on a front end side when inflation has been completed and is attached to the storage portion;
- an occupant protection portion that is provided on a rear end side when inflation has been completed, and is configured to protect the occupant; and
- a cavity portion that is formed at an intermediate portion between the attachment portion and the occupant protection portion in a manner of penetrating the front passenger seat airbag substantially along a left-right direction, and is surrounded by an inflation portion,
- wherein the occupant protection portion is formed substantially along an upper-lower direction on a rear surface side when inflation has been completed,
- wherein the occupant protection portion is formed with restraining recesses configured to allow a head of the occupant that moves forward to enter the occupant protection portion and to restrain the head of the occupant,
- wherein a distal end of a recess of each of the restraining recesses is connected to an inner peripheral surface side of the cavity portion, and
- wherein the restraining recesses which are recessed toward a vehicle front side are formed on both sides of a central region which is configured to be positioned opposite the head of the occupant when inflation has been completed.

10. The front passenger seat airbag according to claim 9, further comprising
- an upper side support inflation portion and a lower side support inflation portion that constitute upper and lower inflation portions around the cavity portion,
- wherein an upper end side and a lower end side of the occupant protection portion extend forward when inflation has been completed, and are supported by the upper side support inflation portion and the lower side support inflation portion, and
- wherein the upper side support inflation portion and the lower side support inflation portion communicate with each other by a communication inflation portion that constitutes a front surface side of the cavity portion.

11. The front passenger seat airbag according to claim 10,
- wherein the upper side support inflation portion includes an upper side support surface portion that is provided on a front end side and is supported by a windshield provided above the instrument panel when inflation has been completed, and
- wherein the lower side support inflation portion includes a lower side support surface portion that is provided on a front end side and is supported by the instrument panel when inflation has been completed.

12. The front passenger seat airbag according to claim 11, wherein the cavity portion opens in a substantially square shape as viewed from left and right sides when inflation has been completed.

13. The front passenger seat airbag according to claim 10, wherein the cavity portion opens in a substantially square shape as viewed from left and right sides when inflation has been completed.

* * * * *